US012612779B2

(12) United States Patent
     Gill et al.

(10) Patent No.: US 12,612,779 B2
(45) Date of Patent: Apr. 28, 2026

(54) ARTICULATED PERIMETER WALL FOR AN INDUSTRIAL WORKSITE

(71) Applicant: Urban Solution Group, LLC, Denver, CO (US)

(72) Inventors: Heidi Gill, Denver, CO (US); J.R. Barker, Denver, CO (US); Alex Hesse, Denver, CO (US); Tom Neppl, Denver, CO (US)

(73) Assignee: Urban Solution Group, LLC, Denver, CO (US)

( * ) Notice: Subject to any disclaimer, the term of this patent is extended or adjusted under 35 U.S.C. 154(b) by 405 days.

(21) Appl. No.: 18/471,984

(22) Filed: Sep. 21, 2023

(65) Prior Publication Data

US 2024/0011280 A1    Jan. 11, 2024

Related U.S. Application Data

(63) Continuation of application No. 17/001,453, filed on Aug. 24, 2020, now Pat. No. 11,767,666, which is a
(Continued)

(51) Int. Cl.
F16L 3/04        (2006.01)
E04B 1/344        (2006.01)
(Continued)

(52) U.S. Cl.
CPC ............ E04B 1/345 (2023.08); E04B 1/3445 (2013.01); E04B 1/388 (2023.08); E04B 1/86 (2013.01);
(Continued)

(58) Field of Classification Search
CPC .. E04B 1/388; E04B 2001/389; F16B 7/0493; F16B 2/08; F16L 3/243; F16L 3/04
See application file for complete search history.

(56) References Cited

U.S. PATENT DOCUMENTS 2,245,611 A        6/1941   Schultz
2,246,457 A   *   6/1941   Schultz ................... F16B 35/04
                                                                    411/401
(Continued)

FOREIGN PATENT DOCUMENTS

FR              2303979 A1 *  10/1976

*Primary Examiner* — Adriana Figueroa
(74) *Attorney, Agent, or Firm* — Brownstein Hyatt Farber Schreck, LLP

(57)                ABSTRACT

Embodiments are directed to a hinged perimeter barrier or wall for an industrial worksite. The perimeter barrier may be formed from a series of wall sections that include hinged panels. The wall sections may be delivered to the worksite in an unextended configuration and then hoisted (by crane) into an extended configuration. A top panel may include a set of lifting features that may be engaged to raise (unfold) the panels and form the wall section. The wall section may be secured to a structural support using a support attachment assembly. The perimeter barrier may be used to mitigate various byproducts of an industrial worksite, including noise, dust, odor, light, and so on. The panels may be formed from an acoustic dampening material, visual mitigation material, and/or various other materials as may be appropriate for a given worksite.

20 Claims, 28 Drawing Sheets

Related U.S. Application Data continuation of application No. 16/119,791, filed on Aug. 31, 2018, now Pat. No. 10,767,362.

(60) Provisional application No. 62/553,696, filed on Sep. 1, 2017.

(51) Int. Cl.

| | | |
|---|---|---|
| *E04B 1/38* | (2006.01) | |
| *E04B 1/86* | (2006.01) | |
| *E04B 2/60* | (2006.01) | |
| *F16B 2/08* | (2006.01) | |
| *F16B 7/04* | (2006.01) | |
| *G10K 11/162* | (2006.01) | |
| *E04G 21/32* | (2006.01) | |
| *E21B 41/00* | (2006.01) | |

(52) U.S. Cl.

CPC ................. *E04B 2/60* (2013.01); *F16B 2/08* (2013.01); *F16B 7/0493* (2013.01); *F16L 3/04* (2013.01); *G10K 11/162* (2013.01); *E04B 2001/389* (2023.08); *E04B 2103/00* (2013.01); *E04G 21/32* (2013.01); *E21B 41/00* (2013.01)

(56) References Cited

U.S. PATENT DOCUMENTS

| | | | | |
|---|---|---|---|---|
| 3,180,446 | A | | 4/1965 | Wenger |
| 3,347,572 | A | * | 10/1967 | Pfaff, Jr. ................. E04H 12/24 |
| | | | | 248/230.1 |
| 3,414,219 | A | | 12/1968 | Seigel |
| 3,435,909 | A | | 4/1969 | Urch |
| 3,600,870 | A | | 8/1971 | Greenhalgh |
| 3,630,309 | A | | 12/1971 | Wenger |
| 4,278,145 | A | | 7/1981 | Eade |
| 4,402,384 | A | | 9/1983 | Smith |
| 4,500,064 | A | * | 2/1985 | Calabro ................. E04H 12/22 |
| | | | | 248/539 |
| 4,587,788 | A | | 5/1986 | Bielicki |
| 4,605,090 | A | | 8/1986 | Melfi |
| 4,630,974 | A | | 12/1986 | Sherman |
| 4,860,985 | A | * | 8/1989 | Olson ....................... G09F 7/18 |
| | | | | 248/214 |
| 4,917,338 | A | * | 4/1990 | Olson ....................... G09F 7/18 |
| | | | | 248/214 |
| 4,992,005 | A | | 2/1991 | Hilfiker |
| 4,993,670 | A | | 2/1991 | Tesar |
| 5,272,284 | A | | 12/1993 | Schmanski |
| 5,274,888 | A | | 1/1994 | Payne |
| 5,530,211 | A | | 6/1996 | Rogers |
| 5,566,916 | A | * | 10/1996 | Bailey ..................... F16L 3/243 |
| | | | | 248/539 |
| 5,661,930 | A | | 9/1997 | Porter |
| 5,875,591 | A | | 3/1999 | Jines |
| 5,954,305 | A | | 9/1999 | Calabro |
| 6,332,298 | B1 | | 12/2001 | Bigelow |
| 6,481,165 | B1 | | 11/2002 | Romary |
| 6,561,473 | B1 | | 5/2003 | Ianello |
| 6,968,653 | B2 | | 11/2005 | Stapleton |
| 7,694,634 | B2 | | 4/2010 | Wiebe |
| 8,505,685 | B1 | | 8/2013 | Rayfield |
| 8,720,129 | B2 | | 5/2014 | Sias |
| 8,756,867 | B2 | | 6/2014 | Maxam |
| 8,939,143 | B2 | * | 1/2015 | Zuritis .................... F24S 25/15 |
| | | | | 52/301 |
| 9,469,510 | B2 | | 10/2016 | Phillip |
| 9,885,174 | B2 | * | 2/2018 | Buck ..................... E04B 1/8227 |
| 10,100,861 | B2 | | 10/2018 | Zhang |
| 10,206,501 | B1 | | 2/2019 | Kindred |
| 2010/0282418 | A1 | | 11/2010 | Lucas |
| 2013/0199868 | A1 | | 8/2013 | Bergiadis |

* cited by examiner

*DETAIL 3-3*

DETAIL 5-5

1400

TRANSITION WALL SECTION FROM UN-EXTENDED TO EXTENDED CONFIGURATION ⟋—1402

ATTACH WALL SECTION TO STRUCTURAL SUPPORT(S) ⟋—1404

ATTACH WALL SECTION TO ADJACENT WALL SECTION(S) ⟋—1406

ARTICULATED PERIMETER WALL FOR AN INDUSTRIAL WORKSITE

CROSS-REFERENCE TO RELATED APPLICATIONS

This application is a continuation application of U.S. Non-Provisional patent application Ser. No. 17/001,453, filed Aug. 24, 2020, and titled "Articulated Perimeter Wall for an Industrial Worksite," which claims the benefit of U.S. Non-Provisional patent application Ser. No. 16/119,791, filed Aug. 31, 2018, and titled "Articulated Perimeter Wall for an Industrial Worksite," now U.S. Pat. No. 10,767,362, which claims the benefit of U.S. Provisional Patent Application No. 62/553,696, filed Sep. 1, 2017, and titled "Articulated Perimeter Wall for an Industrial Worksite," the disclosures of which are hereby incorporated herein by reference in their entirety.

FIELD

The described embodiments relate generally to perimeter barriers for an industrial worksite. More particularly, the present embodiments relate to structures that facilitate transport and installation of perimeter barriers.

BACKGROUND

Industrial operations in urban or environmentally sensitive regions pose an increasing challenge. Noise, dust, odor, light, or other byproducts may adversely impact nearby residences, businesses, wildlife, or other pre-existing elements. As industrial operations become interspersed with existing communities, industrial operators may have a need to mitigate some of the potential impacts related to normal or predicted industrial operations.

Perimeter barriers may be constructed at a worksite to mitigate such impacts. Many traditional barriers are large, one-piece panels that are connected or "flown-in" (by crane) to supports or anchors on the worksite. In many cases, traditional barriers may be challenging to assemble, especially in windy or non-ideal conditions. Additionally, some traditional barriers may be difficult to ship or store due to their bulky size or form factor. The embodiments described herein may be used to implement an industrial noise mitigation solution without some of the drawbacks associated with some traditional techniques.

SUMMARY

Embodiments of the present disclosure are directed to a perimeter wall for an industrial worksite, such as an oil-extraction worksite.

In a first aspect, the present disclosure describes an acoustic wall for an industrial worksite. The acoustic wall includes a set of structural supports offset from one another. Each structural support of the set of structural supports has a fixed end embedded in a foundation. The acoustic wall further includes a set of wall sections configured to extend around the industrial worksite and dampen sound. A wall section of the set of wall sections is configured to transition between an unextended configuration and an extended configuration during a lifting operation. The wall section includes a first acoustic panel that defines a portion of a top edge of the wall section in the extended configuration. The wall section further includes a second acoustic panel rotatably coupled to the first acoustic panel and configured to rotate relative to the first acoustic panel during the lifting operation to be substantially planar to the first acoustic panel in the extended configuration. The wall section further includes a third acoustic panel rotatably coupled to the second acoustic panel and configured to rotate relative to the second acoustic panel during the lifting operation to be substantially planar to the first and second acoustic panels in the extended configuration. The acoustic wall further includes a set of section attachment assemblies. Each section attachment assembly of the set of section attachment assemblies is configured to couple adjacent wall sections of the set of wall sections. The acoustic wall further includes a set of support attachment assemblies. Each support attachment assembly of the set of support attachment assemblies is configured to attach a wall section of the set of wall sections to a structural support of the set of structural supports.

In another aspect, the present disclosure describes a wall section for an acoustic wall extending around an industrial worksite. The wall section includes a first acoustic panel defining a portion of a top edge of the acoustic wall and including a first frame and a first acoustic sheet attached to the first frame and configured to dampen sound. The wall section includes a second acoustic panel rotatably coupled to the first acoustic panel and including a second frame and a second acoustic sheet attached to the second frame and configured to dampen sound. The wall section further includes a third acoustic panel rotatably coupled to the second acoustic panel and including a third frame and a third acoustic sheet attached to the third frame and configured to dampen sound. The wall section further includes a first set of hinges rotatably coupling the first acoustic sheet and the second acoustic sheet and a second set of hinges rotatably coupling the second acoustic sheet and the third acoustic sheet. In an extended configuration, the first, second, and third acoustic panels cooperate to define a substantially planar first surface and a second surface opposite the first surface. The first set of hinges is attached to the first and second acoustic panels along the first surface. The second set of hinges is attached to the second and third acoustic panels along the second surface. The wall section is configured to attach to a structural support having a fixed end embedded in a foundation. The wall section is configured to attach to a first additional wall section along a first edge and a second additional wall section on a second edge opposite the first edge to define a portion of the acoustic wall that extends around the industrial worksite.

In still another aspect, the present disclosure describes a mitigation wall that includes a set of structural supports and a set of wall sections. The set of structural supports is offset from one another and each structural support of the set of structural supports has a fixed end embedded in a foundation. A wall section of the set of wall sections is configured to attach to a structural support of the set of structural supports and is configured to transition between an unextended configuration and an extended configuration. The wall section includes first, second, and third panel frames and first, second, and third sheets attached to and extending across the first, second, and third panel frames, respectively. The wall section further includes a lifting structure attached to the first panel frame and configured to be engaged by a crane during a lifting operation in which the wall section is lifted to transition from the unextended configuration to the extended configuration. The wall section further includes a first joining mechanism coupling the first panel frame and the second panel frame and a second joining mechanism coupling the second panel frame and the third panel frame. When the wall section is in the extended configuration, the wall section is configured to attach to an adjacent wall section of the set of wall sections, and the adjacent wall section defines a second substantially planar surface that is coplanar with the first substantially planar major surface when the wall section and the adjacent wall section are attached. The wall sections of the set of wall sections cooperate to at least one of dampen sound, mitigate pollutants, mitigate odors, or visually conceal one or more sites.

In yet another aspect, the present disclosure describes a support attachment mechanism for securing a wall section to a structural support. The support attachment mechanism includes a cable including a first coupling feature at a first end of the cable and a second coupling feature at a second end of the cable. Each of the first and second coupling features have a first width. The support attachment mechanism further includes a connector defining first and second openings, each of the first and second openings includes a wide portion having a second width greater than the first width and a narrow portion having a third width less than the first width. The narrow portion of the first opening is configured to retain the first coupling feature. The narrow portion of the second opening is configured to retain the second coupling feature, thereby forming a closed loop.

In another aspect, the present disclosure describes a support attachment assembly for securing a wall section of a mitigation wall to a structural support. The support attachment assembly includes a bracket configured to be positioned against a first surface of the structural support. The structural support has a fixed end and extending vertically from a foundation. The support attachment assembly further includes an attachment mechanism configured to cooperate with the bracket to secure the wall section to the structural support. The attachment mechanism includes a cable configured to extend around a component of the wall section. The cable includes a first end having a first coupling feature and a second end having a second coupling feature. The attachment mechanism further includes a connector configured to releasably retain the first and second coupling features, thereby forming a closed loop around the component of the wall section, and a threaded fastener configured to attach the connector to the bracket.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1:
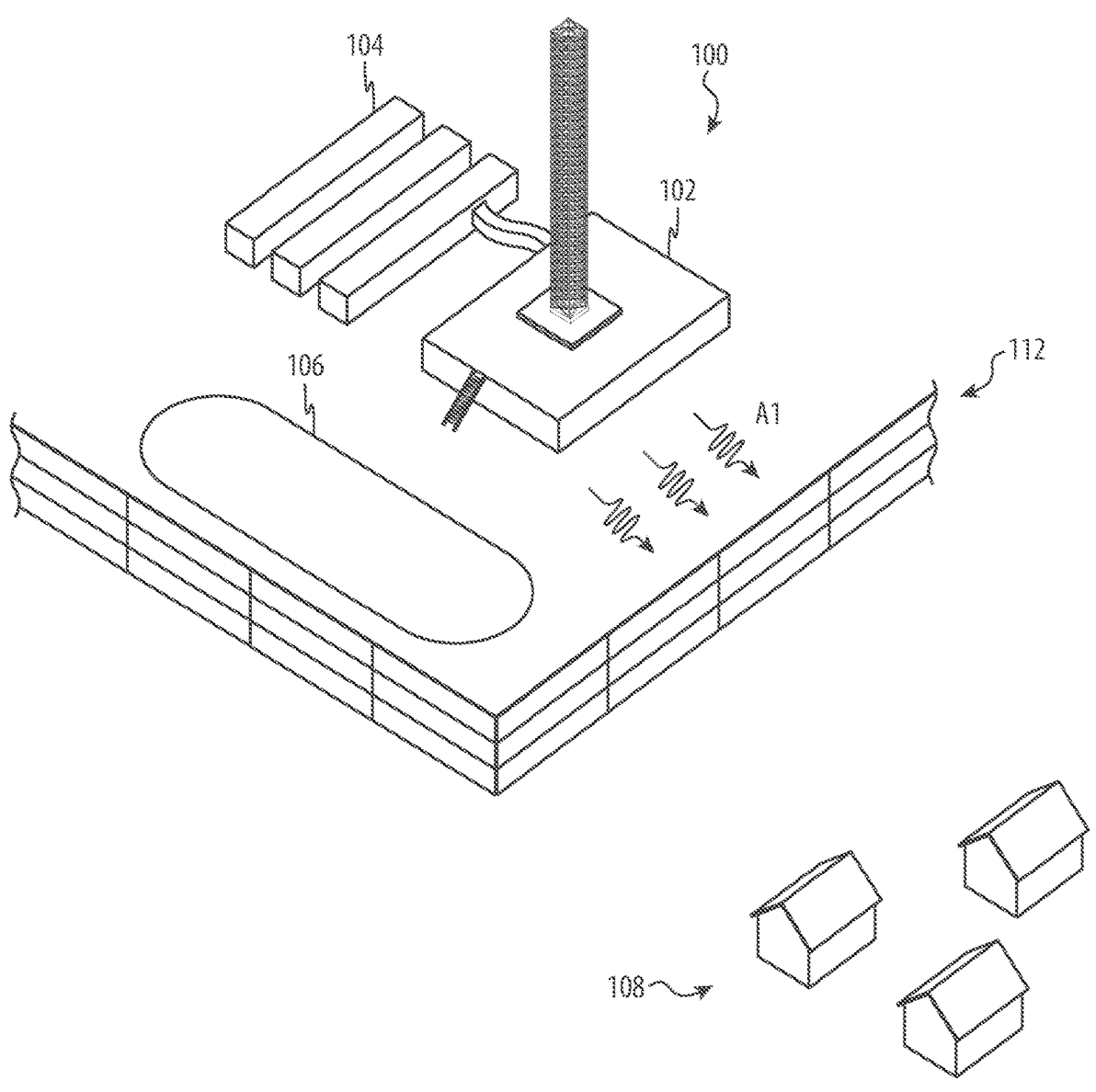
FIG. 1 depicts an industrial worksite having an acoustic wall.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and settings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to barrier or perimeter walls for an industrial worksite. An industrial worksite, such as an oil-extraction worksite, may generate substantial sound, dust, odor, light, and/or other byproducts that may impact a surrounding community or environment. The operational impacts may be exacerbated in an urban environment or other location in which the industrial worksite is situated within a high-density or sensitive environmental region. Freestanding barriers erected along a perimeter of the industrial worksite may be cumbersome, awkward, or otherwise unwieldy for installation, given weight, size, shape, rigidity, and other characteristics and factors of such barriers, which may be especially problematic in an urban environment.

In a sample embodiment, the articulated barrier of the present disclosure may be a mitigation wall that dampens or otherwise reduces sound and/or other operational impacts emanating from an industrial worksite. As used herein, the term "operational impacts" is meant to include any materials, energy, or other byproducts of a worksite, including but not limited to sound, vibration (audible and inaudible), dust and other particulates, odor, light, and the like. As used herein, the term "sound" is meant to include any audible vibrations propagating through a transmission medium. The mitigation wall may include a set of wall sections made up of hinged connected panels. Each wall section may have an unextended (e.g., folded) configuration in which the panels are folded or otherwise collapsed, and an extended (e.g., unfolded) configuration in which the panels are unfolded, extended, or the like. The wall sections may be delivered to an industrial worksite in an unextended or folded configuration. The panels may be transitioned to an extended configuration, for example, unfolded, at the worksite to form a mitigation wall.

The unextended or folded wall sections may have dimensions that are suitable for transport through an urban or sensitive environment on existing roads or infrastructure when in the folded configuration. For example, each panel may have a width corresponding to a width of a standard vehicle frame (such as a semi-trailer or truck trailer), thereby allowing the unextended wall sections to be transported without substantial difficulty.

Once delivered to the worksite, the unextended wall sections may be offloaded, and the wall sections may be hoisted (by a crane, or other lifting mechanism) into an extended configuration. In the extended configuration, the hinged acoustic panels may have substantially coplanar major surfaces that define a mitigation wall configured to mitigate potential impacts created by an industrial worksite. As used herein, the terms "mitigate" or "mitigation" may be used to refer to absorption, redirection, or otherwise preventing or affecting transmission of operational impacts. For example, the mitigation wall may be an acoustic wall configured to mitigate the effects of sound from the worksite on surrounding areas by redirecting, absorbing, or otherwise preventing or affecting transmission of acoustic waves (e.g., sound and/or vibrational waves) emanating from the worksite. In various embodiments, the extended wall section may be attached to the structural supports, as discussed in more detail below.

As discussed above, the panels of a wall section may be movably coupled (e.g., rotatably coupled) to facilitate transitions between the unextended and extended configurations. As used herein, the term "movably coupled" may refer to any direct or indirect attachment of two panels that allows the panels to move or articulate relative to one another. As used herein, the term "rotatably coupled" may refer to any direct or indirect attachment of two panels that allows the panels to rotate relative to one another. In various embodiments, adjacent pairs of panels may be positioned along a joint region. The adjacent panels may articulate about the joint region (e.g., rotate or move about an axis of the joint region) using a coupling mechanism movably coupling the two panels, such as a hinge. Wall sections may include multiple adjacent panels in the vertical configuration, such as three, four, five, or more panels, where each adjacent panel is coupled along a respective joint region. The panels may be configured for alternating articulation, such that each subsequent adjacent panel may articulate in an opposing direction along the corresponding joint region. This may allow the set of panels to define an accordion-style structure having a folded or collapsed configuration (for storage, transportation) and a vertically extended configuration (defining a wall section).

In some embodiments, the panel includes a mitigation sheet extending at least partially across and attached to a frame. The mitigation sheet may be formed of any suitable material or combination of materials for mitigating operational impacts, including rubber, metal, plastic, or other suitable materials. For example, the mitigation sheet may be an acoustic sheet formed of rubber, an elastomer, or a combination of materials. The frame may define a structure of the panel and may take any suitable form. For example, the frame may be a tubular steel frame. In various embodiments, one or more hinges, support attachment assemblies, and/or section attachment assemblies may be attached to the frame, the sheet, or both.

In certain embodiments, one of the panels of a wall section may define a top edge of a wall section, thereby defining a portion of a top edge of the mitigation wall. The top edge may be used to receive a lifting or upward force that causes the wall section to transition from an unextended or folded configuration to an extended or unfolded configuration. For example, one or more panels of a wall section may include one or more lifting features (e.g., hooks, eyelets, protrusions, bores, lug plates, and/or other features) configured to receive a lifting mechanism (from a crane) that exerts an upward (perpendicular) force on the wall section. The upward force, in turn, causes adjacent panels to articulate in opposing directions along a corresponding joint region. This may occur until the wall section substantially unfolds and defines a vertically extended configuration, in which the major surfaces of the panels are substantially coplanar with one another to define the mitigation wall.

In some embodiments, multiple wall sections are interconnected (e.g., attached to one another) to form a mitigation wall. Interconnecting the wall sections may improve the performance of the mitigation wall by improving the wall's ability to perform mitigation functions, for example by reducing gaps in the mitigation wall to better contain or block operational impacts from transmission. Interconnecting the wall sections may additionally improve the performance of the mitigation wall by enhancing the stability or structural rigidity of wall sections in the extended configuration. In some cases, the section attachment assemblies may be (horizontally) aligned with a joint region used to articulate adjacent panels. Such positioning of section attachment assemblies may impede or prevent articulation of the adjacent panels. This may help the panels of a wall section form a substantially rigid or continuous (substantially non-articulating) structure in the extended configuration. Interconnecting the wall sections may additionally improve the performance of the mitigation wall by distributing load forces across multiple wall sections. For example, the force applied to a portion of the mitigation wall by a localized wind gust may be distributed to multiple wall sections to reduce the risk of wall failure or damage. Wall sections may attach to one another using one or more section attachment assemblies. Section attachment assemblies may include brackets, cabling, fasteners, plates, and other mechanisms suitable for attaching wall sections.

As discussed above, extended wall sections may be attached to one or more structural supports that are embedded in the ground or other form of foundation. In some embodiments, the unextended wall sections may be offloaded near one or more structural supports to simplify the attachment process. In some embodiments, the structural supports include a pair of structural beams (e.g., I-beams, posts, columns, and the like) that are embedded (e.g., anchored, driven) into a foundation at the worksite. As used herein, "foundation" may refer to a dedicated foundation or footing (e.g., a concrete, gravel, or other foundation), the ground (e.g., soil, rock), and/or any other suitable body or opening in which the structural supports may be disposed. In various embodiments, an end of the structural beam is fixed by being embedded in the foundation or otherwise fixed along a ground plane. The structural beams may also have free ends, opposite the fixed ends, such that the structural supports define freestanding structural supports or anchors of the acoustic wall.

In some embodiments, attaching a wall section to structural supports maintains the wall section in a vertical configuration. In some embodiments, the wall sections are vertically self-supporting, and attaching a wall section to structural supports allows the wall section to resist lateral forces, such as wind forces. Wall sections may attach to structural supports using one or more support attachment assemblies. Support attachment assemblies may include brackets, cabling, fasteners, angles, and other mechanisms suitable for attaching wall sections to structural supports.

In various embodiments, attaching the wall sections to structural supports may improve the performance of the mitigation wall by distributing load forces across multiple different components. For example, the force applied to a wall section of the mitigation wall (e.g., by a wind gust) may be distributed to structural supports to reduce the risk of wall failure or damage. In some embodiments, the structural supports are configured to deflect in response to a load force (e.g., a wind load). In various embodiments, the deflection of the structural supports allows the mitigation wall to deflect and self-limit the forces on the wall. In some embodiments, the mitigation wall is designed to deflect prior to structural failure of the components of the wall. This prevents damage to the mitigation wall, such as non-ductile failure (e.g., breakage) of components. In some embodiments, the support attachment assemblies allow horizontal rotation about the structural support. This allows full flexibility in the field to provide wall layouts that match the needs of each individual site. In various embodiments, the support attachment assemblies, the section attachment assemblies, the wall sections, or some combination thereof, create a rigid condition between structural supports in their final configuration. This forces deflection compatibility between structural supports and dampens the local forces over a broader area of the mitigation wall.

In various embodiments, the wall sections may be removably attached to one another and/or the structural supports, meaning that they may be detached from each other without significant damage. In various embodiments, wall sections may be attached and detached to other wall sections and/or structural supports multiple times. Similarly, section attachment assemblies and support attachment assemblies may be used multiple times for installation at the same or a different worksite. Therefore, when a mitigation wall is reconfigured to be removed, such as when the operations at a worksite cease, the wall sections may be removed from the structural supports and returned to a folded configuration for subsequent transportation to another worksite. The mitigation wall described herein may therefore provide a collapsible, portable, and moveable perimeter barrier, which may thereby enhance the efficiency of operational impact mitigation of an industrial worksite.

It will be appreciated that the acoustic mitigation wall and accompanying acoustic panels described herein are presented for purposes of illustration only. In some cases, the panels may be visual mitigation panels, odor mitigation panels, dust mitigation panels, moisture mitigation panels, and so on, as may be appropriate for a given application. Barrier or perimeter walls configured to impede light (visual effects), odor, dust, moisture, vibration, and/or other byproducts may thus be constructed in a manner substantially analogous to that as described herein with relation to the acoustic wall. As such, any discussion of acoustic panels or an acoustic mitigation wall is meant as illustrative only.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an example industrial worksite 100 having an acoustic wall 112, such as the mitigation wall or acoustic wall generally discussed above and described in greater detail below. The acoustic wall 112 may define a physical barrier around some or all of the industrial worksite 100. As described herein, the acoustic wall 112 may be configured to impede sound, such as depicted by arrows A1, or otherwise mitigate or reduce the impact of sound, dust, odor, light, and/or other byproducts of the industrial worksite 100. As such, the acoustic wall 112 may also be used for visual mitigation of an industrial worksite 100, as may be appropriate for a given application.

In a non-limiting example, the industrial worksite 100 is shown as an oil-extraction worksite, though it may be any suitable worksite, including other mineral extraction sites, manufacturing or fabrication facilities, and/or substantially any other worksite that may emit sound or other byproducts into a surrounding environment. The industrial worksite 100 may be situated near an environment 108. The environment 108 may include an urban environment including residential, commercial, and/or other buildings that may be inhabited or used for commercial or industrial purposes. The environment 108 may also include sensitive environmental regions, including wildlife, plants, geologic formations, and so on.

The industrial worksite 100 may emit various byproducts that result from the operation of equipment and processes therein. Such byproducts (including sound, audible and inaudible vibration, dust and other particulates, odor and light) may be directed incidentally toward the environment 108, which may adversely affect surrounding areas in the absence of mitigation techniques. For example, as shown in FIG. 1, the industrial worksite 100 may emit sound A1 generally toward the environment 108. Rather than suggest that sound travels exclusively along a particular path, the illustrated sound is depicted to be a representation of diffuse audial signals that may emanate from the industrial worksite 100. The sound A1 may be due to the operation of oil extraction equipment 102, auxiliary equipment 104, or other equipment associated with the industrial worksite 100. The sound A1 may include a broad spectrum of sound that is due to the operation of pumps, generators, engines, or other mechanical systems that are associated with the industrial worksite 100.

The acoustic wall 112 may extend partially or fully around the industrial worksite 100 and mitigate or impede the propagation of the sound A1 toward the environment 108. For example, the acoustic wall 112 may be positioned between the industrial worksite 100 and the environment 108 and include a set of acoustic panels that may dampen the sound A1. In some cases, the acoustic wall 112 will include one or more overlapping sections or gates to allow persons and/or equipment to enter and exit the industrial worksite 100 while still providing an acoustic barrier that substantially surrounds the industrial worksite 100. As described herein, the acoustic wall 112 may be made up of wall sections that include folding or collapsible panels (e.g., acoustic panels). The foldable or collapsible panels may allow for the acoustic wall 112 to be readily disassembled, transported, and stored when the operations of the industrial worksite 100 cease and/or the acoustic wall 112 is otherwise no longer required. The foldable construction may also facilitate assembly and disassembly of the acoustic wall 112, particularly when the environment 108 exhibits windy or other non-ideal conditions (such as that present in a high-density or sensitive environmental region). For example, the panels may be extended from the ground instead of being "flown" by a crane, thereby reducing the difficulty of assembling the wall.

For purposes of illustration, FIG. 1 depicts the industrial worksite 100 as including an oil extraction equipment 102, auxiliary equipment 104, and a pit 106. It should be noted that the industrial worksite 100 may also include various other components and systems, such as one or more engines, compressors, hydraulic systems, heavy equipment, vehicles, storage facilities, and so on. In various embodiments, the walls described herein, such as the acoustic wall 112, may be used at various sites, including construction worksites, event sites, and the like. As such, the discussion of any industrial worksite, such as the industrial worksite 100, is meant as illustrative only.

Figure 2:
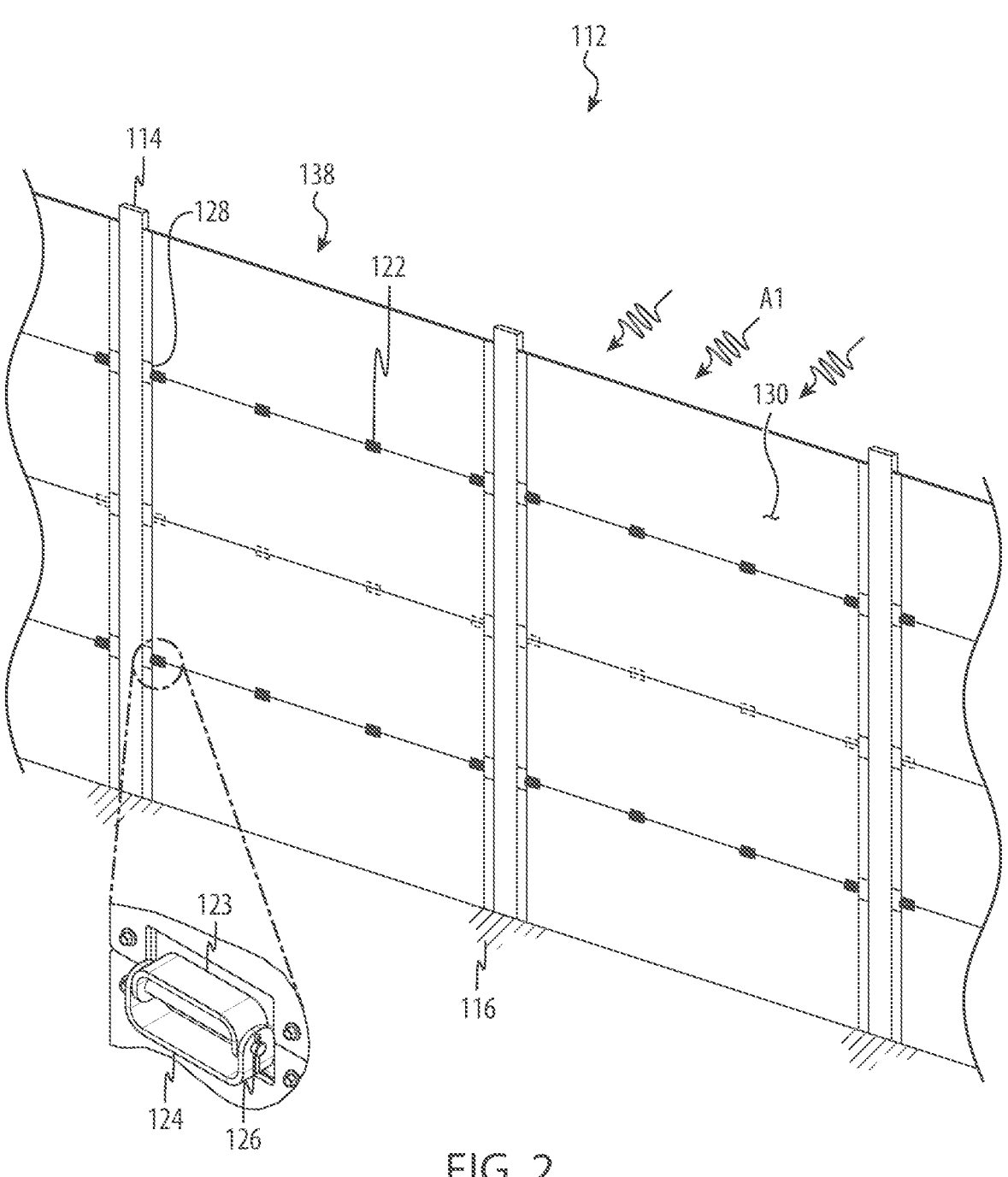
FIG. 2 depicts an embodiment of the acoustic wall of FIG. 1.

FIG. 2 depicts an embodiment of the acoustic wall 112 described above with respect to FIG. 1. The acoustic wall 112 may form a physical perimeter around or partially around an industrial worksite 100 (FIG. 1) that emits a sound A1. The acoustic wall 112 includes a set of wall sections 138 that include acoustic panels that may mitigate, impede, or otherwise dampen the sound A1 as it traverses the panels. The wall sections 138 may be supported in a vertical configuration by fixed supports anchored into a foundation.

For example, as shown in FIG. 2, the acoustic wall 112 includes structural supports 114 (e.g., structural beams) offset from one another and having fixed ends positioned along a foundation (such as foundation 116) and extending vertically from the foundation. The acoustic wall 112 may also include wall sections 138 having a set of acoustic panels that have substantially coplanar major surfaces (e.g., a front surface 130 and an opposing rear surface) configured to dampen the sound A1. In some embodiments, each wall section 138 and each of the set of acoustic panels of a wall section 138 may extend horizontally between a given pair of the structural supports 114. In some embodiments, wall sections 138 are positioned differently relative to one another and/or the structural supports 114 from those shown in FIG. 2. For example, the wall sections 138 may be arranged such that they contact or nearly contact along their edges and may be directly coupled to one another. Similarly, the wall sections 138 may be coupled to the structural supports 114 along a major surface (e.g., front surface 130 or an opposing rear surface) and the structural supports 114 may be inset from the edges of the wall sections 138. Example arrangements of the wall sections 138 and the structural supports 114 are discussed in more detail below with respect to FIGS. 6A-6F.

As shown in FIG. 2, the wall section 138 may be a representative wall section. It will be appreciated that the acoustic wall 112 may be formed from multiple, distinct wall sections that are each separately attached to the structural beams 114 or other fixed support. As used herein, the wall sections, the acoustic panels and/or other components or assemblies of the acoustic wall 112 may be discussed individually or collectively. It will be understood that a discussion relating to any individual wall sections, acoustic panels, brackets, hinges, structural beams, and so on, may apply to any other such components or assemblies of the acoustic wall 112.

The acoustic wall 112 may also include a set of coupling mechanisms (e.g., hinges 122) that movably (e.g., pivotably) couple adjacent panels of a wall section 138. As explained in greater detail below with respect to FIGS. 3A-3C, the wall section 138 may be configured for alternating articulation such that subsequent adjacent panels articulate in opposing directions, much like the bellows of an accordion. To facilitate the foregoing, the set of hinges 122 may be positioned on alternating sides of the wall section 138 or otherwise be configured to allow adjacent panels of the acoustic panels of the wall section 138 to articulate in opposing directions. For example, a first subset of the set of hinges 122 may couple a first set of adjacent panels along a first side of the wall section 138, while another subset of the set of hinges 122 may couple a second set of adjacent panels along a second opposing side of the wall section 138; however, other configurations are possible.

In a sample embodiment, a given hinge of the set of hinges 122 may be defined by corresponding U-shaped members. For example, a first U-shaped member 123 may be received by a second U-shaped member 124 and pivotally coupled to one another about a pin 126. The first U-shaped member 123 may be fixed relative to a first panel of the wall section 138, while the second U-shaped member 124 may be fixed relative to an adjacent acoustic panel. This may allow the adjacent panels to pivot relative to one another about the pin 126. As shown in FIGS. 3B and 3C, the set of hinges 122 may allow the wall section 138 to transition from a folded or unextended (collapsed) configuration to an unfolded or vertically extended configuration that defines the acoustic wall 112.

In the extended configuration shown in FIG. 2, the wall section 138 may be secured to structural supports 114 using one or more support attachment assemblies (e.g., brackets 128). The brackets 128 may be a substantially rigid and removable component or assembly of the acoustic wall 112 that is attachable to both a particular structural support 114 and the wall section 138. For example, a first portion or surface of a bracket 128 may be connected to the structural support 114 and another portion or surface of the bracket 128 may be connected to the wall section 138.

The brackets 128 may be horizontally aligned with at least a subset of the set of hinges 122. For example, as shown in FIG. 2, the brackets 128 may overlap or partially overlap adjacent panels of the wall section 138. As such, the brackets 128 may extend over or traverse a joint region about which the adjacent panels are configured to articulate using the set of hinges 122. Such positioning of the brackets 128 may therefore impede or prevent the articulation of the adjacent panels, and thus enhance the structural rigidity of the acoustic wall 112. To facilitate the foregoing, the brackets 128 may partially overlap adjacent panels of the wall section 138 along a side of the wall section 138 opposite from the set of hinges 122 used to couple the adjacent panels. In this manner, the brackets 128 may be positioned substantially flush with the major surfaces of the adjacent acoustic panels and temporarily lock or restrain the set of hinges 122 from articulating the adjacent acoustic panels.

Figure 3A:
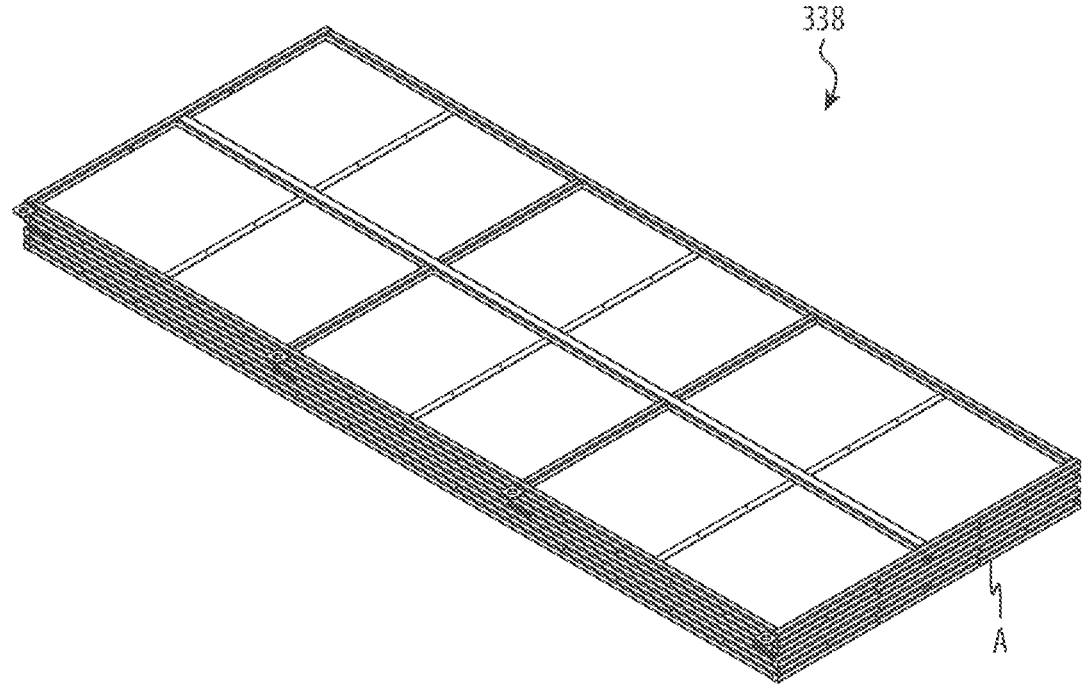
FIG. 3A depicts an acoustic wall in an unextended configuration.
Figure 3B:
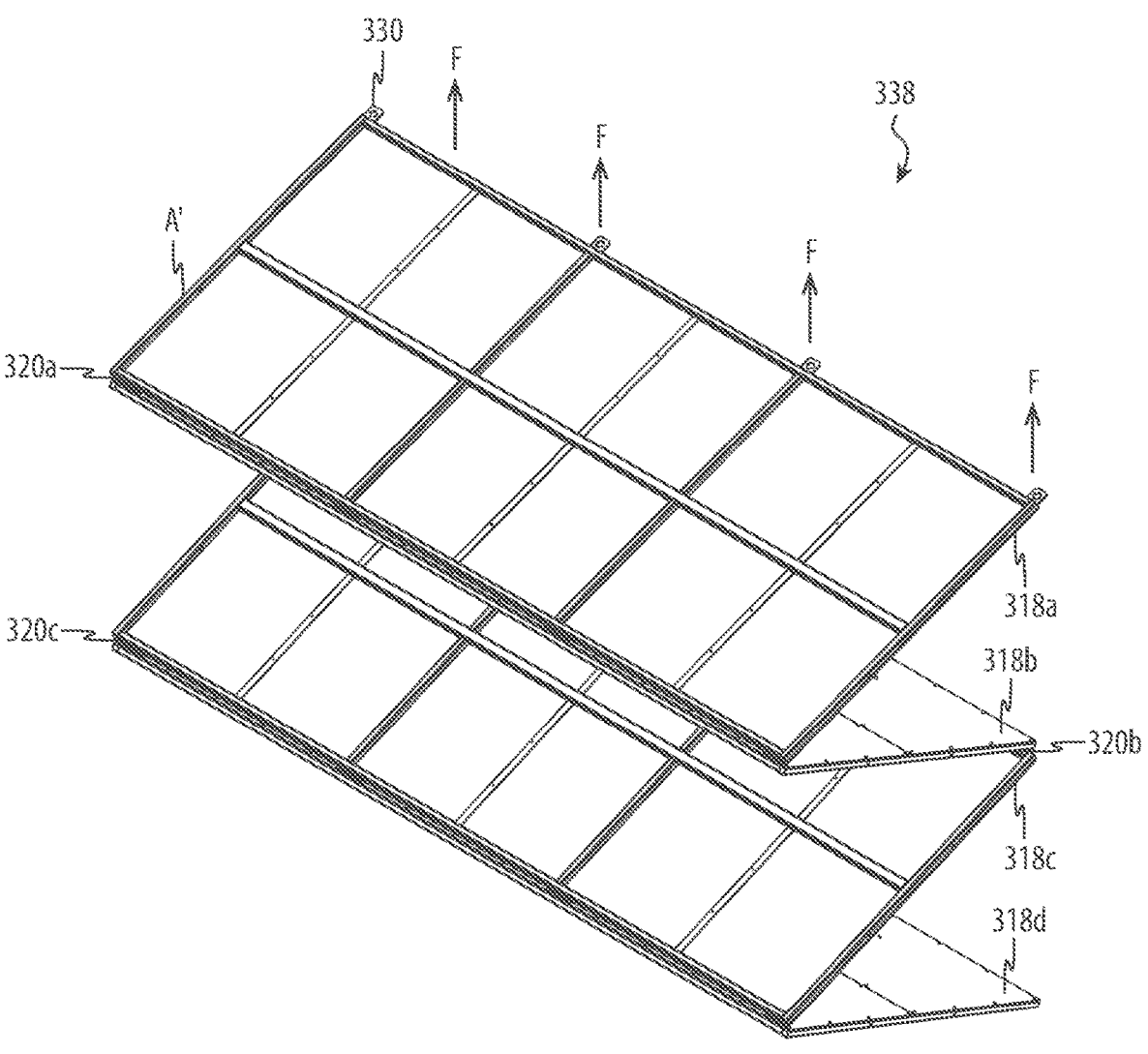
FIG. 3B depicts the acoustic wall of FIG. 3A in a partially extended configuration.
Figure 3C:
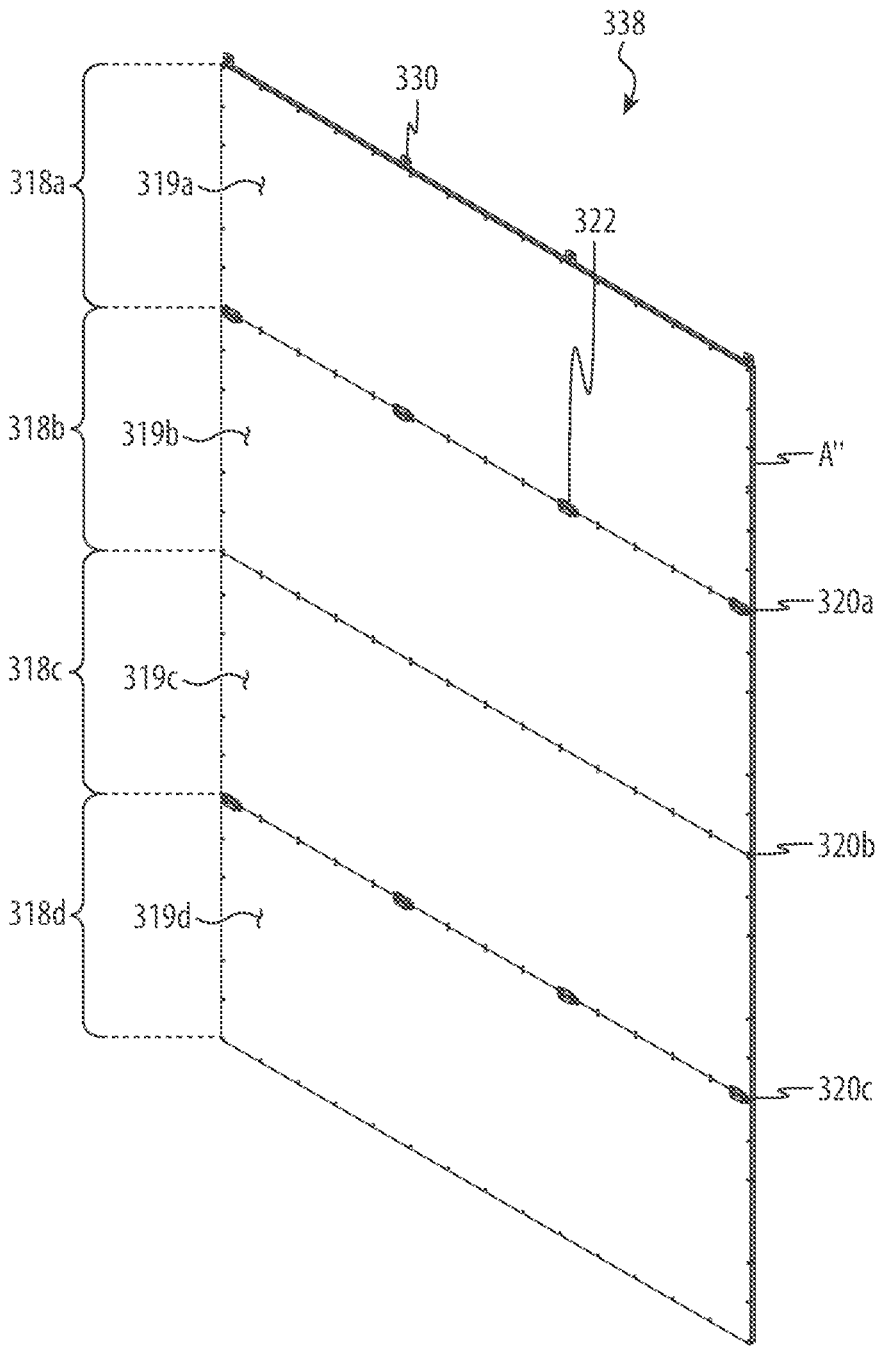
FIG. 3C depicts the acoustic wall of FIG. 3A in an extended configuration.

FIGS. 3A-3C depict sample embodiments of a wall section 338 (similar to the wall section 138 above) in an unextended or folded configuration. As described herein, wall sections of the present disclosure may be delivered to a worksite in a folded configuration (such as on a semi-trailer or other vehicle). Once unloaded adjacent a pair of fixed supports, an upward force may be applied to a top panel of the wall section 338. The upward force may cause adjacent panels of the wall section to articulate in opposing directions. This may occur until the panels substantially unfold and define the extended configuration, in which major surfaces of the set of acoustic panels may be substantially coplanar with one another and define the acoustic wall.

FIGS. 3A-3C depict a wall section 338 in various states of expansion or transition between an unextended (folded) configuration and an extended configuration, as described herein. It will be appreciated, however, that the wall section 338 may be substantially analogous to the wall section 138 described above with respect to FIG. 2. For example, the wall section 338 may be used to form an acoustic barrier between an industrial worksite and an environment.

With reference to FIG. 3A, the wall section 338 is shown in an unextended configuration A, which may also be referred to as a folded, collapsed, or shipping configuration. In configuration A, the panels of the wall section 338 may be folded or positioned over one another or stacked. In particular, the wall section 338 may be stacked such that major surfaces of individual panels are offset and substantially parallel to one another. However, it is not necessary that the individual panels be parallel. In the configuration A, the wall section 338 may be collapsed and have a width corresponding to that of a standard vehicle frame, such as between 90 and 110 inches (228.6 and 279.4 centimeters) wide. In some cases, the width is between 96 and 102 inches (243.8 and 259.1 centimeters) wide. This may allow the unextended wall section 338 to be transported by a vehicle to a worksite using standard infrastructure, roads, and so forth. In other cases, the width may be less than 90 inches (228.6 centimeters) or greater than 110 inches (279.4 centimeters), as may be appropriate for a given application.

With reference to FIG. 3B, the wall section 338 is shown in a partially extended configuration A'. In configuration A', the wall section 338 may begin to unfold in response to an upward or lifting force F received along a top edge. The upward or lifting force F may be the result of a crane or other lifting mechanism that engages the top edge. As described above with respect to FIG. 2, adjacent panels of the wall section 338 may articulate relative to one another along a joint region using one or more hinges. As such, as the force F causes a first acoustic panel defining the top edge to move upward, subsequent acoustic panels may correspondingly articulate and "unfold" in order to define the configuration A'. As described herein, the wall section 338 may be configured for alternating articulation, such that each subsequent adjacent acoustic panel of the wall section 338 articulates in an opposing direction. This may allow the wall section 338 to define an accordion-styled structure that is configured to transition between a folded and extended state.

To facilitate the foregoing, the wall section 338 may include four distinct acoustic panels: a first acoustic panel 318a, a second acoustic panel 318b, a third acoustic panel 318c, and a fourth acoustic panel 318d. However, it will be appreciated that the wall section 338 may include more or fewer acoustic panels as may be appropriate for a given application. The first acoustic panel 318a may define a top edge of the extended wall section 338, and thereby define a portion of a top edge of an acoustic wall. The top edge may include or define one or more lifting features (e.g., hooks, eyelets, protrusions, bores, lug plates, and/or other features) configured to engage a lifting mechanism (such as a lifting hook of a crane) and receive the upward force F. For example, the top edge may include or define lug plates 330, generally referred to as lifting features. While FIG. 3B shows each of the lug plates 330 receiving the upward or lifting force F, this is not required; in some cases, a subset of the lug plates 330 may receive the upward or lifting force F.

As shown in FIG. 3B, the wall section 338 includes pairs of acoustic panels. Any two adjacent panels of the individual acoustic panels 318a-318d may be a pair of adjacent acoustic panels. For example, the first acoustic panel 318a and the second acoustic panel 318b may be a first pair of adjacent acoustic panels. Further, the second acoustic panel 318b and the third acoustic panel 318c may be a second pair of adjacent acoustic panels. And further, the third acoustic panel 318c and the fourth acoustic panel 318d may be a third pair of adjacent acoustic panels. Accordingly, the first and second pair of adjacent acoustic panels may have a shared or common acoustic panel. Similarly, the second and third pair of adjacent acoustic panels may also have a shared or common acoustic panel.

The upward or lifting force F may cause the panels of the wall section to articulate relative to one another and unpack or unfold from the unextended configuration A of FIG. 3A and into the configuration A' of FIG. 3B. In particular, the upward force F may cause the first acoustic panel 318a to articulate relative to the second acoustic panel 318b about a first joint region 320a in a first direction. In turn, this may lift the second acoustic panel 318b and cause the second acoustic panel 318b to articulate relative to the third acoustic panel 318c about a second joint region 320b in a second direction opposite the first direction. In turn, this may lift the third acoustic panel 318c and cause the third acoustic panel to articulate relative to the fourth acoustic panel 318d about a third joint region 320c in a third direction opposite the second direction. In turn, this may lift the fourth acoustic panel 318d (from a ground plane). Each of the acoustic panels 318a-318d may continue to correspondingly articulate and move until the wall section 338 assumes an extended configuration.

With reference to FIG. 3C, the wall section 338 is shown in an extended configuration A". In configuration A", the wall section 338 may be substantially fully extended such that the individual acoustic panels 318a-318d are vertically aligned. In particular, major surfaces of the individual acoustic panels 318a-318d may be substantially coplanar. For example, as shown in FIG. 3C, the first acoustic panel 318a may define a major surface 319a, the second acoustic panel 318b may define a major surface 319b, the third acoustic panel 318c may define a major surface 319c, and the fourth acoustic panel may define a major surface 319d. The major surfaces 319a-319d may thus be substantially coplanar major surfaces of the wall section 338. The individual acoustic panels 318a-318d may cooperate (unfold) to define the acoustic barrier described herein.

As illustrated in the configuration A" of FIG. 3C, a set of hinges 322 may couple adjacent panels of the wall section 338. The set of hinges 322 may couple the adjacent panels along a joint region extending between the panels. The set of hinges 322 may be configured such that each subsequent adjacent panel of the wall section 338 articulates in an opposing direction. In the embodiment of FIG. 3C, four distinct hinges of the set of hinges 322 may be spaced apart along the joint region 320a and pivotally couple the first acoustic panel 318a and the second acoustic panel 318b to one another. Another four distinct hinges of the set of hinges 322 may be spaced apart along the joint region 320b and pivotally couple the second acoustic panel 318b and the third acoustic panel 318c to one another. Finally, another four distinct hinges of the set of hinges 322 may be spaced apart along the joint region 320c and pivotally couple the third acoustic panel 318c to the fourth acoustic panel 318d to one another. It will be appreciated, however, that the four distinct hinges along each of the respective joint regions is depicted in FIG. 3C for purposes of illustration only. In other cases, more or fewer hinges may be used, including embodiments in which the entire joint region is defined by a single hinge spanning a length of the adjacent acoustic panels.

As described herein, one or more attachment assemblies may attach wall sections to other wall sections and/or structural supports to form or define the acoustic wall. Attachment assemblies may include support attachment assemblies configured to attach wall sections to structural supports and section attachment assemblies configured to attach wall sections to other wall sections. In some embodiments, the same attachment assembly is configured to attach one or more wall sections to a structural support and to one or more additional wall sections. Attachment assemblies may include brackets, cabling, fasteners, angles, and other mechanisms suitable for attaching wall sections. In some embodiments, attachment assemblies may be connected to the structural support and overlap (or partially overlap) adjacent panels of one or more wall sections. This may help impede or prevent articulation of the adjacent panels about a joint region. The structural supports may be structural beams (e.g., a pair of I-beams), posts, columns, and/or any other appropriate structure configured to secure the wall sections in an extended configuration.

Figure 4A:
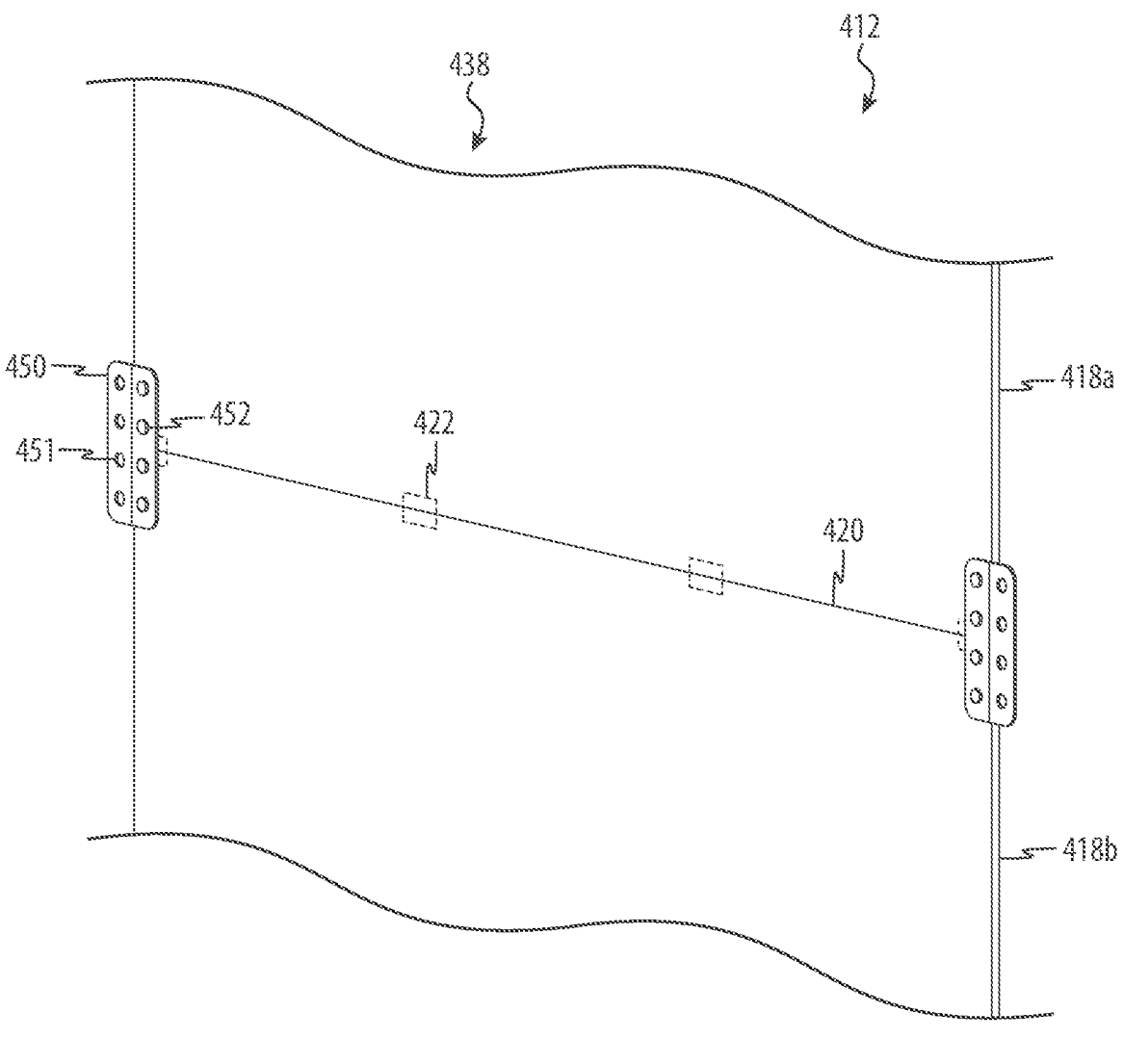
FIG. 4A depicts an acoustic wall having an attachment assembly connected to a wall section.
Figure 4B:
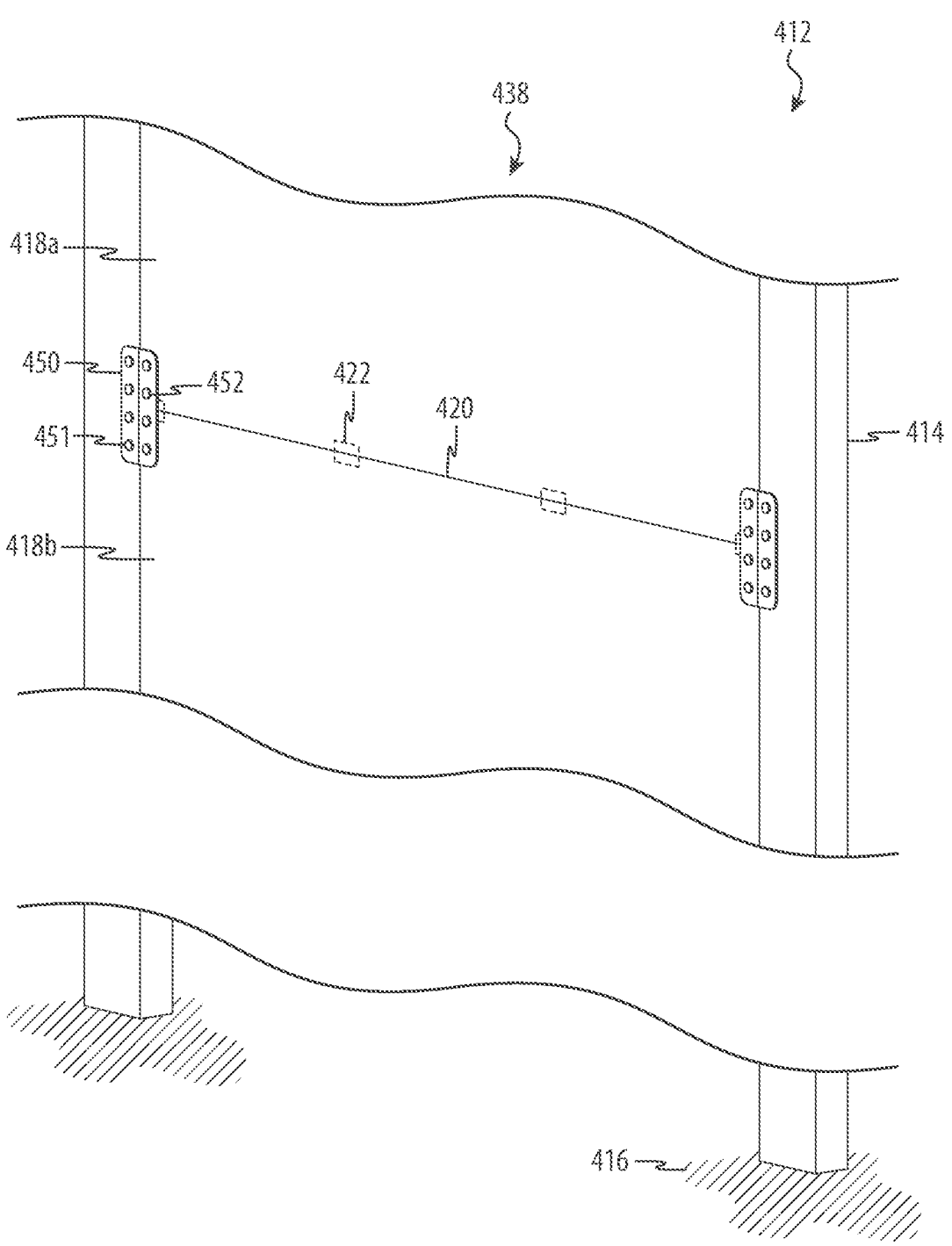
FIG. 4B depicts the wall section of FIG. 4A attached to a structural support.
Figure 4C:
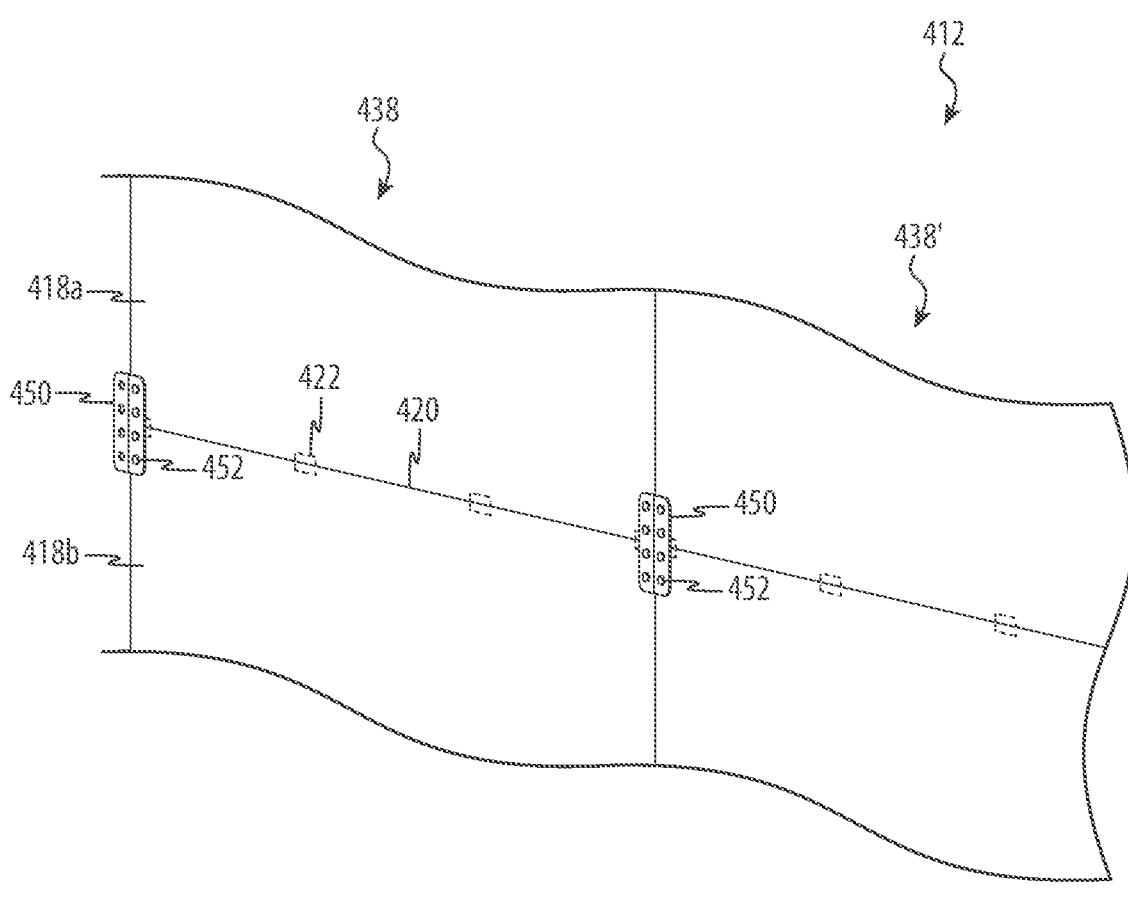
FIG. 4C depicts the wall section of FIG. 4A attached to an adjacent wall section.

FIGS. 4A-4C depict a sample acoustic wall 412 having wall sections connected to attachment assemblies and structural supports in various configurations. It will be appreciated that the acoustic wall 412 may be substantially analogous to the acoustic wall 112 described above with respect to FIGS. 1 and 3C. For example, the acoustic wall 412 may be used to form an acoustic barrier between an industrial worksite and an environment; and, as shown in FIG. 4A-4C, it may include a set of acoustic panels, a first acoustic panel 418a, a second acoustic panel 418b, a joint region 420, and a set of hinges 422, and so on.

With reference to FIG. 4A, the acoustic wall 412 is shown having an attachment assembly (e.g., bracket 450) connected to a wall section 438. In particular, the bracket 450 is connected to both a first acoustic panel 418a and a second acoustic panel 418b. As such, the bracket 450 overlaps or partially overlaps the first and second acoustic panel 418a, 418b and traverses, extends over, or is otherwise positioned along a joint region 420. The bracket 450 may be a rigid structure that substantially prevents the first and second acoustic panels 418a, 418b from articulating or pivoting about the joint region 420. For example, a set of hinges 422 (shown in phantom) may be positioned opposite the bracket 450 and used to couple the first and second acoustic panels 418a, 418b along the joint region 420. The bracket 450 may therefore be positioned flush with major surfaces of the first and second acoustic panels 418a, 418b and attached thereto, thereby providing a rigid connection that facilitates use of the set of hinged acoustic panels as a single rigid or continuous (non-articulating) acoustic barrier.

The bracket 450 may define holes 451, each of which is configured to receive a fastener 452 (e.g., a screw, pin, stud, bolt, rivet, or the like). The fastener 452 may extend through the hole 451 and removably attach the bracket 450 to the wall section 438. The bracket 450 and the fasteners 452 may collectively define attachment assemblies that are positioned along opposite sides or edges of the wall section 438 and configured to secure the wall section to another wall section and/or a structural support.

With reference to FIG. 4B, the wall section 438 is shown attached to a pair of structural supports. In particular, the wall section 438 may be attached to structural beams 414. The structural beams 414 may be offset from one another and anchored or embedded into a foundation 416 (e.g., the ground or another foundation) such that the structural beams 414 have a fixed end positioned in the foundation 416.

The wall section 438 may be coupled to the structural beams 414 using one or more support attachment assemblies (e.g., the bracket 450). In the sample embodiment depicted in FIG. 4B, a first portion or surface of the bracket 450 may be attached to the wall section 438, as described above with respect to FIG. 4A. A second portion or surface of the bracket 450 may be attached to a structural beam 414. For example, a subset of the holes 451 may receive fasteners 452 that may removably secure the bracket 450 to the structural beam 414. The bracket 450 may thus provide a substantially stiff or rigid connection or coupling between the structural beams 414 and the wall section 438. Multiple brackets 450 or other attachment assemblies may be positioned along opposing sides of the wall section 438. In some embodiments, one or more pairs of brackets 450 are aligned with at least a subset of the set of hinges 422. However, other configurations are possible. For example, the bracket 450 may be positioned in a variety of overlapping or partially overlapping positions with at least one of the panels of the wall section 438 and a structural beam 414. As such, while the bracket 450 is depicted in FIG. 4B as a plate or substantially planar structure, attachment assemblies having other shapes and structures may be used to connect the wall sections 438 and the structural beams 414, including angled structures, channeled structures, tubes, projections, and so on.

With reference to FIG. 4C, the wall section 438 is shown attached to an adjacent wall section 438'. The adjacent wall section 438' may be substantially analogous to the wall section 438 described above with respect to FIGS. 4A and 4B. For example, the adjacent wall section 438' may include multiple individual acoustic panels that may be manipulated from a folded (collapsed) configuration to an extended vertical configuration.

The wall section 438 may be coupled to the adjacent wall section 438' using one or more of the brackets 450 or other attachment assemblies. In the sample embodiment depicted in FIG. 4C, a pair of the brackets 450 may be connected to both the wall section 438 and the adjacent wall section 438'. For example, a first one of the brackets 450 may be connected to the wall section 438 and a second one of the brackets 450 may be connected to the adjacent wall section 438' using the attachment techniques described above with respect to FIGS. 4A and 4B (e.g., using holes 451 and fasteners 452). The brackets 450 may be aligned along respective joint regions of the wall section 438 and the adjacent wall section 438' thereby preventing articulation about the joint region. In other cases, the brackets 450 may be positioned or aligned with an individual one of the panels.

The brackets 450 may be connected to the wall sections using fasteners 452, as shown in FIG. 4B. This may limit movement of the bracket 450 and form a substantially rigid connection between the wall section 438 and the adjacent wall section 438'. In this manner, the adjacent wall section 438' may define a fixed support used to maintain the wall section 438 in a vertical, extended configuration. It will be appreciated, however, that the embodiment of FIG. 4C is not described in isolation from the structural supports described with respect to FIG. 4B. In some cases, the wall section 438 and/or the adjacent wall section 438' may be attached to one or more structural supports that support the wall section 438 and the adjacent wall section 438', thereby enhancing the rigidity and stability of the acoustic wall 412.

Figure 5:
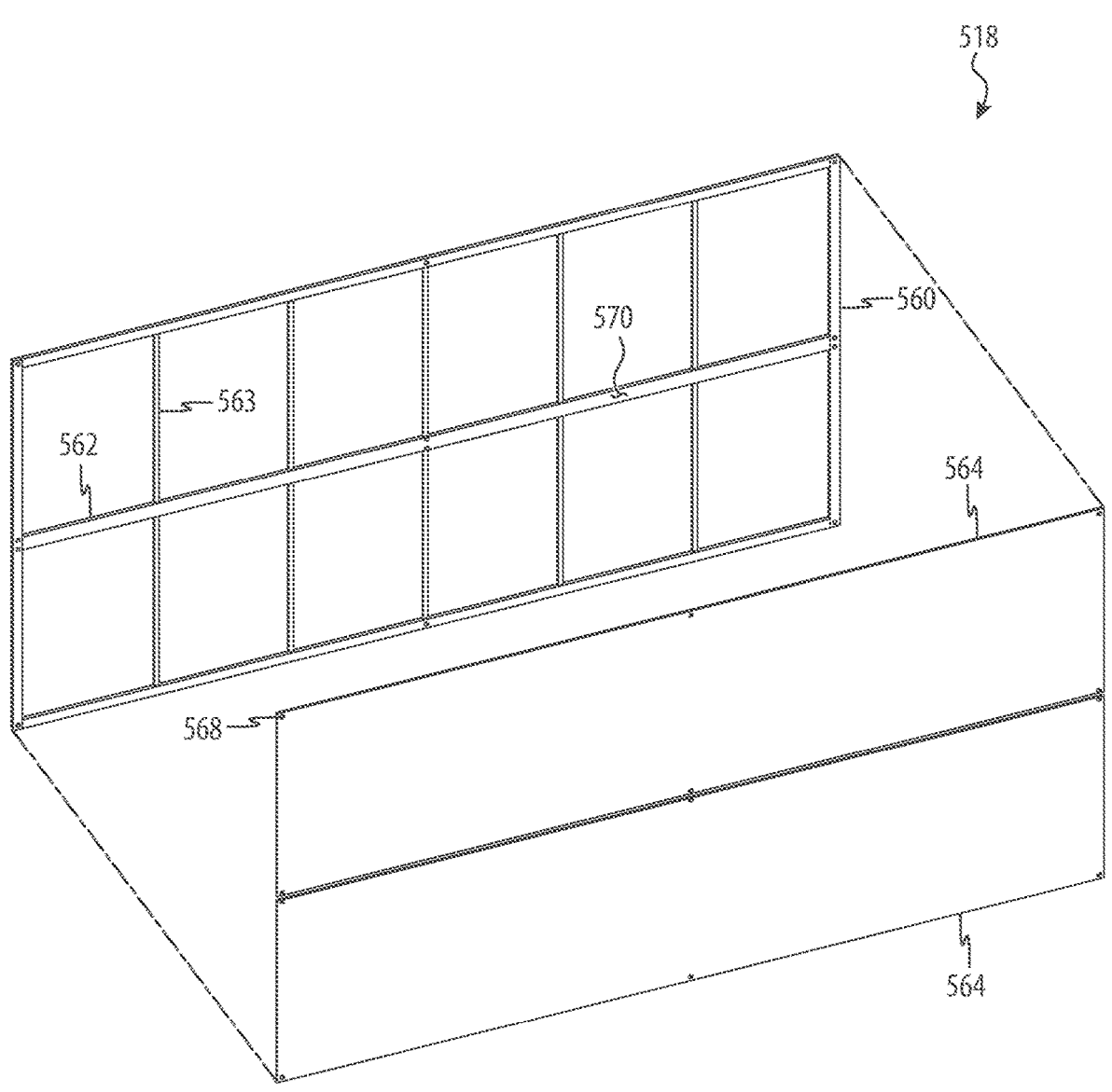
FIG. 5 depicts an exploded view of an example acoustic panel.

FIG. 5 depicts an exploded view of an example acoustic panel 518. The acoustic panel 518 may be substantially analogous to any of the acoustic panels described herein, for example, such as one or more panels of the wall sections 138, 338, 438, and 438'. The acoustic panel 518 may be one of a set of alternating articulating acoustic panels configured to dampen a sound in an extended configuration. As such, the acoustic panel 518 may include any appropriate joint region, hinge, bracket, hook, and so on, not shown in FIG. 5 in the interest of clarity.

The acoustic panel 518 may include a panel frame 560, one or more sheets 564 (e.g., sheets of acoustic dampening material), and sheet connectors 568. Broadly, panel frame 560 may be a structural component or assembly of the acoustic panel 518, providing shape and rigidity. The panel frame 560 may be constructed from metal or metal alloys such as aluminum or steel; however, other materials are possible including plastics, ceramics, and so on. In some embodiments, the panel frame is constructed from tubular steel members that are welded, bolted, or otherwise fastened together. The panel frame 560 may include various metal members, ribs, internal support beams, and so on, used to maintain the rigidity of the acoustic panel 518 and joined to form a unitary structural assembly. As shown in FIG. 5, the panel frame 560 includes a crossbeam 562 and a set of ribs 563. The crossbeam 562 and the set of ribs 563 may form a ladder-style framework that provides a mounting surface for the sheets 564.

The sheets 564 may be positioned over one or both major surfaces of the panel frame 560 (e.g., surface 570 and an opposing surface). The sheets 564 of acoustic dampening material may be flexible and/or substantially planar structures that may be configured to mitigate operational impacts (e.g., impede a sound, block light or otherwise serve as a visual barrier, mitigate dust, odors, and the like). The sheets 564 may be constructed from a rubber, elastomer, fabric, synthetic, composite, and/or other material that mitigates operational impacts. For example, the sheets 564 may be constructed from an acoustic dampening material that dampens a sound when the signal impacts or traverses the material. As such, the sheets 564 may cause sound traveling through or impacting the acoustic panel 518 to be perceived as being quieter or muffled, than would otherwise be expected absent the acoustic panel 518. The sheets 564 may also be used to form a visual mitigation barrier. For example, the sheets 564 may be constructed from, or formed with, a visual mitigation (e.g., opaque or translucent) material that allows the acoustic wall described herein to blend or match with a surrounding environment.

The sheets 564 may be attached to the panel frame 560 using one or more sheet connectors 568. One or more holes may be defined in the panel frame 560 and the sheets 564. For example, holes may be defined in each of the panel frame 560 and the sheets 564 of acoustic dampening material and configured (aligned) to receive sheet connectors 568. The sheet connector 568 may be advanced through the holes and used to attach the panel frame 560 to one or more sheets 564. The sheet connectors 568 may be screws, pins, studs, bolts, rivets, and so on, which may be used to attach the panel frame 560 to the sheets 564. In some cases, the sheet connectors 568 may be removable in order to allow new or replacement sheets to be installed with an existing panel frame. In some embodiments, the sheets 564 are offset or spaced apart from the panel frame 560 using one or more spacer washers or other similar type of spacer component. As a result, there may be a gap between the sheet 564 and one or more respective cross members or tubes of the panel frame 560.

Figure 6A:
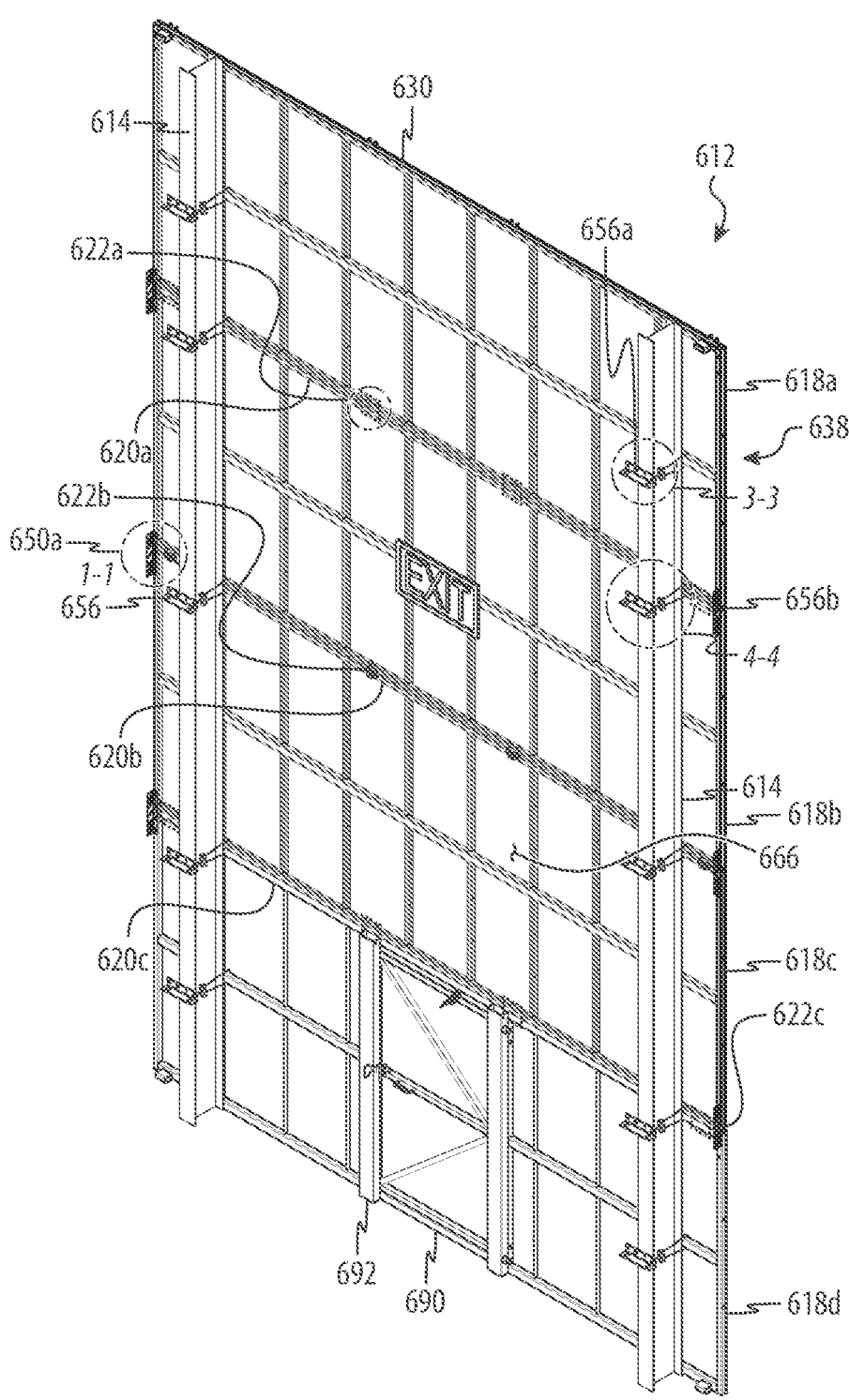
FIGS. 6A-6F show an example acoustic wall.

As discussed above, the wall sections and structural supports discussed herein may be arranged in many ways to form a mitigation wall. FIGS. 6A-6F show another example embodiment of an acoustic wall 612. In some embodiments discussed above with respect to FIGS. 1-5, the structural supports may be positioned along edges of a wall section such that the wall section is between the structural supports. In some embodiments, such as the embodiments depicted in FIGS. 6A-6F, the structural supports may be positioned along a major surface of a wall section such that the structural supports are inset from the edges of the wall section. For example, as shown in FIG. 6A, structural supports 614 are positioned along a major surface 666 of a wall section 638 such that the structural supports 614 are inset from the edges of the wall section 638. The structural supports 614 may be substantially analogous to any of the structural supports described herein, for example, such as structural supports 114 and 414. The structural supports 614 may be offset from one another and each of the structural supports may have a fixed end embedded in a foundation. The structural supports 614 may be structural beams (e.g., a pair of I-beams as shown in FIG. 6A), posts, columns, and/or any other appropriate structure configured to secure the wall sections in an extended configuration. The wall section 638 may be attached to the structural supports 614 using support attachment assemblies 656, as discussed in more detail below.

It will be appreciated that the acoustic wall 612 may be substantially analogous to the acoustic walls 112 and 412 described above with respect to FIGS. 1-5. For example, the acoustic wall 612 may be used to form an acoustic barrier between an industrial worksite and an environment. As shown in FIG. 6A, the acoustic wall 612 may include a set of movably coupled acoustic panels. In some embodiments, the acoustic wall 612 includes a first acoustic panel 618a, a second acoustic panel 618b, a third acoustic panel 618c, and a fourth acoustic panel 618d. The acoustic wall 612 may include joint regions (e.g., joint regions 620a-c) defined between the acoustic panels. In various embodiments, the acoustic panels 618a-d move (e.g., pivot or rotate) relative to one another along the joint regions 620. As discussed above, the acoustic panels 618a-d may be coupled to one another by any suitable means including hinges 622 as shown in FIG. 6A.

As shown in FIG. 6A, each joint region 620 may include a set of hinges (e.g., hinges 622a-c) for rotatably coupling the acoustic panels 618 that define the joint region. In some embodiments, multiple hinges are positioned along the joint region 620. The hinges 622a-c may be any suitable hinges. In some embodiments, each hinge 622a-c includes a first component attached to a first panel and a second component attached to a second panel. The first and second components may be attached using a coupling mechanism (e.g., a pin) that allows the first and second components to pivot around the coupling mechanism to facilitate pivoting of the first and second panels.

Figure 6B:
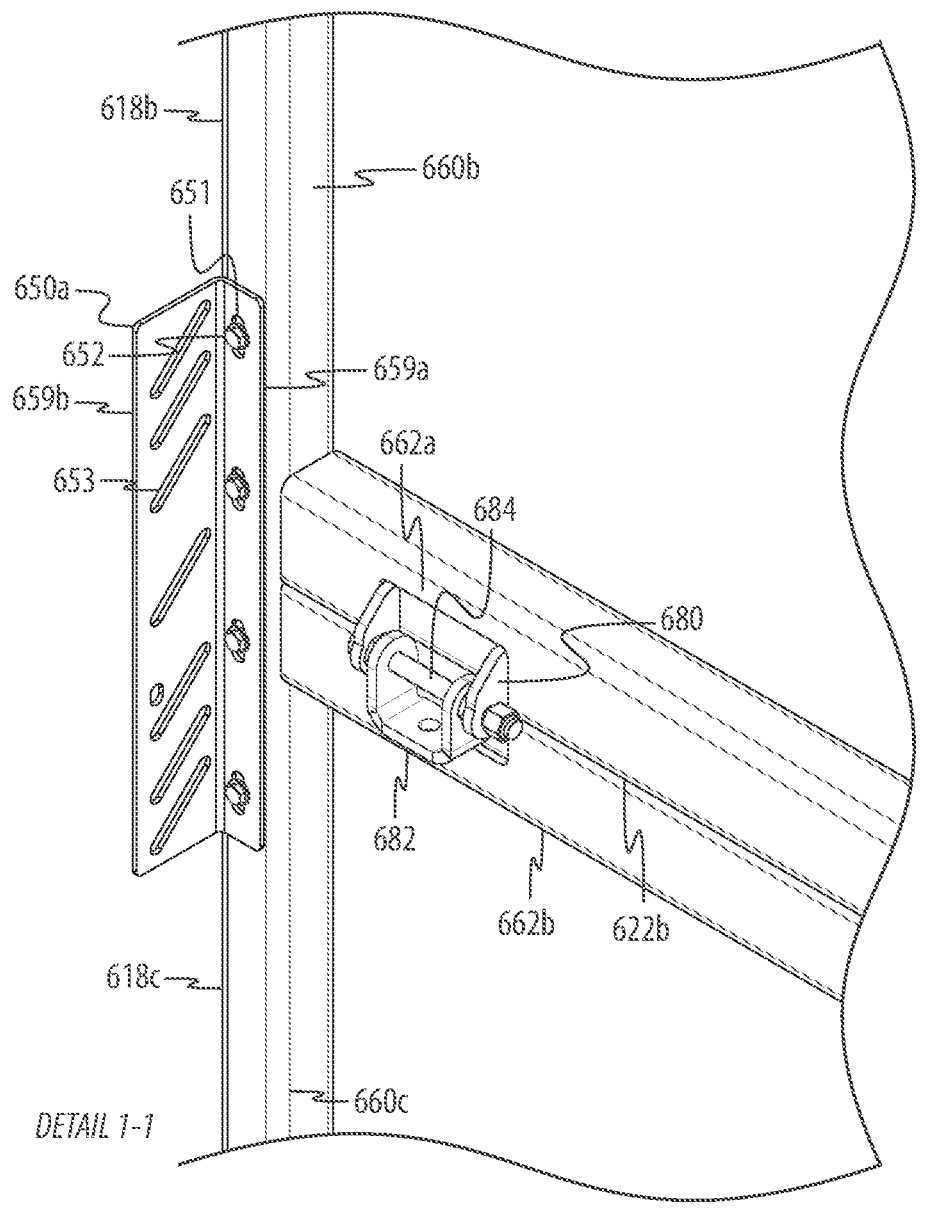

FIG. 6B shows a detail view of area 1-1 of FIG. 6A and shows an example hinge 622b. The hinge 622b includes a first hinge component 680 attached to a frame member 662a of a frame of the second acoustic panel 618b and a second hinge component 682 attached to a frame member 662b of a frame of the third acoustic panel 618c. The hinge 622b includes a pin 684 that extends through holes in the first and second hinge components 680 and 682 and couples the hinge components together. The pin 684 defines a pivot axis that allows the hinge components to pivot relative to one another, thereby allowing the second acoustic panel 618b and the third acoustic panel 618c to pivot relative to one another about the pivot axis. In some embodiments, the first hinge component 680 includes two members attached to the frame member 662a as shown in FIG. 6B. In some embodiments, the second hinge component 682 is a U-shaped component attached to the frame member 662b. The hinge components may be attached to the acoustic panels using any suitable method, including using fasteners, welding, brazing, and the like.

In some embodiments, the hinges are positioned on opposing sides of the wall section 638. For example, returning to FIG. 6A, hinges 622b may be positioned along the joint region 620b on the major surface 666, while hinges 622a and 622c (shown in phantom) are positioned along the joint regions 620a and 620c, respectively, on a surface of the wall section opposite the major surface 666. In various embodiments, this allows for alternating articulation of the acoustic panels, much like the bellows of an accordion. For example, during a transition from the unextended configuration to an extended configuration, the first and second acoustic panels 618a and 618b rotate relative to one another in a first direction, the second and third acoustic panels 618b and 618c rotate relative to one another in a second opposite the first direction, and the third and fourth acoustic panels 618c and 618d rotate relative to one another in the first direction. Said another way, each subsequent adjacent panel may articulate in an opposing direction along the corresponding joint region. This may allow the set of panels to define an accordion-style structure having a folded or collapsed configuration (for storage, transportation) and a vertically extended configuration (defining a wall section).

Similar to the wall section 138 discussed above, the first acoustic panel 618a may define a top edge of the extended wall section 638, and thereby define a portion of a top edge 630 of the acoustic wall 612. The top edge 630 may include or define one or more lifting features (e.g., hooks, eyelets, protrusions, bores, lug plates, and/or other features), such as lug plates (e.g., as shown in FIGS. 3A-3C). The lug plates may be configured to engage a lifting mechanism (such as a lifting hook of a crane) and receive an upward or lifting force. In various embodiments, all or a subset of the lug plates may receive the upward force. The upward force may cause the panels of the wall section to articulate relative to one another and unpack or unfold from an unextended configuration to an extended configuration, for example as described with respect to FIGS. 3A-3C.

As shown in FIG. 6A, in some embodiments, the wall section 638 may include a door 690 that provides access into the worksite or walled area. For example, the door 690 may extend upward from the foundation or ground and may be opened to allow for people, vehicles, and/or cargo to travel through the wall section 638. In the current example, the door 690 is positioned within an opening of the fourth acoustic panel 618d. The door 690 may include a metal or structural frame that is pivotably coupled to the fourth acoustic panel 618d and may include one or more mitigation sheets (e.g., one or more acoustic sheets) attached to the metal or structural frame. In some embodiments, the wall section 638 does not include a door. In various embodiments, one or more wall sections that define the acoustic wall 612 include a door 690 and one or more wall sections that define the acoustic wall do not include a door.

In some embodiments, the wall section 638 includes one or more transport channels (e.g., a tube, conduit, duct, or the like) to facilitate movement of the wall section 638 in its unextended configuration, for example to load and unload the wall section, to reposition the wall section, or the like. As shown in FIG. 6A, the wall section 638 may include substantially parallel transport tubes 692 that are configured to engage a lifting mechanism (such as a fork of a forklift) to move the wall section 638 (e.g., during a moving operation). In some embodiments, the transport tubes 692 are positioned on opposite sides of the door 690. In embodiments in which the wall section 638 does not include a door, the wall section 638 may still include transport tubes 692.

In various embodiments, the acoustic wall 612 includes one or more section attachment assemblies configured to attach adjacent wall sections. The section attachment assemblies may include one or more section attachment components, such as section attachment component 650a shown in FIG. 6A. Turning again to FIG. 6B, a detailed view of a section attachment component 650a attached to the wall section 638 is shown. In various embodiments, one or more section attachment components cooperate to form a section attachment assembly that attaches adjacent wall sections. The section attachment component 650a is shown as a corner (L-shaped) bracket having a first portion 659a and a second portion 659b that is substantially perpendicular to the first portion 659a. The first portion 659a defines openings 651 (e.g., slotted holes) configured to align with corresponding openings defined in the wall section 638. For example, the openings 651 may be configured to align with openings defined in frame(s) 660 of one or more acoustic panels (e.g., frames 660b and 660c of acoustic panels 618b and 618c, respectively). The openings 651 may be slotted or elongated in a first direction to allow for vertical or lateral adjustment of the attachment component 650a along the wall section 638. Fasteners 652 (e.g., bolts) may attach the section attachment component 650 to the wall section 638, using the openings 651. The fasteners 652 may be any suitable type of fastener, such as those discussed herein. In some embodiments, the section attachment component 650a is integrated with (e.g., forms a unitary structure with) the wall section 638. For example, the section attachment component 650a may be a part of a frame of a panel of the wall section 638.

Figure 6C:
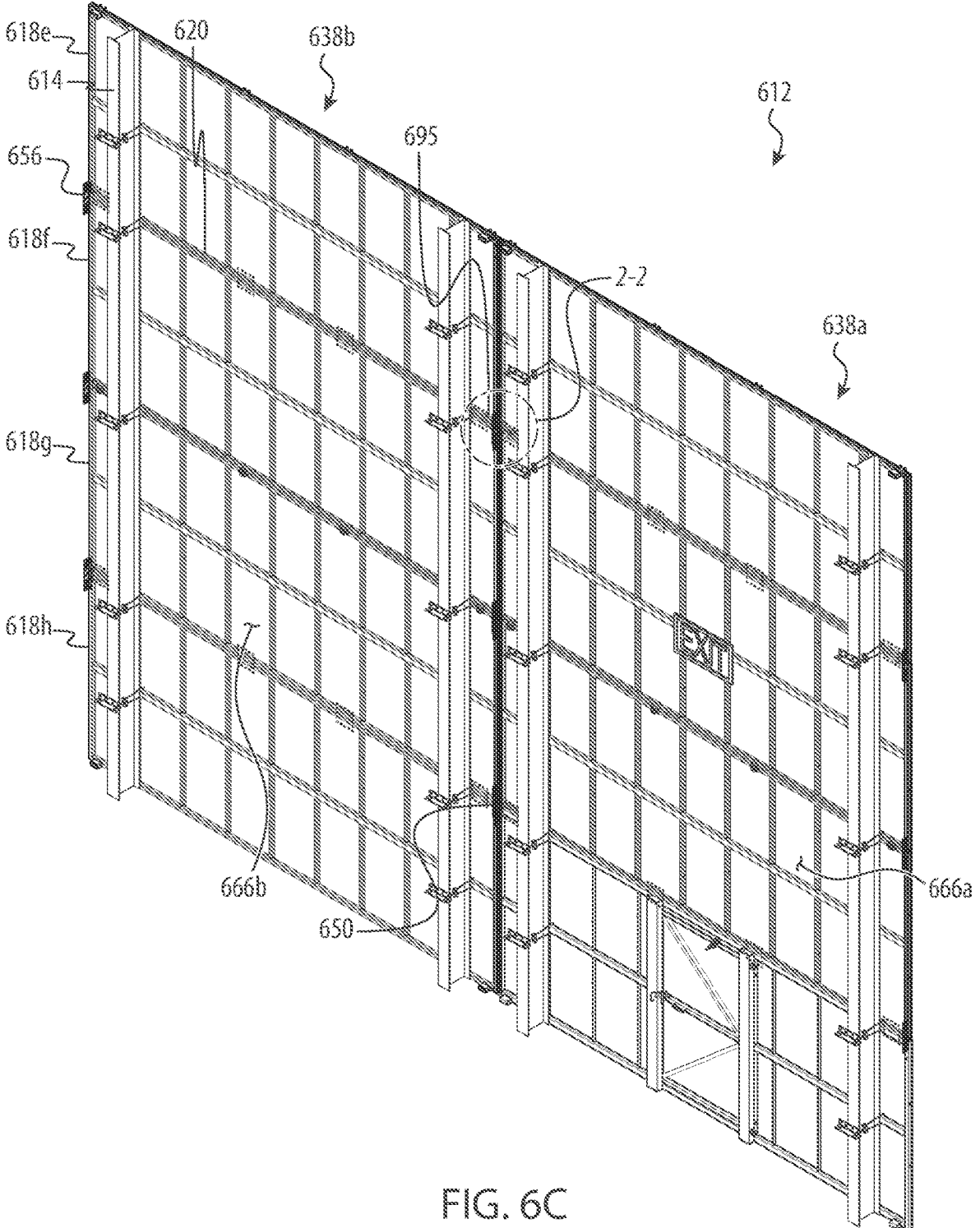

As shown in FIG. 6C, section attachment components may be connected to multiple panels of a wall section. As such, the section attachment components may extend across a joint region 620. The section attachment component may be a rigid structure that substantially prevents the acoustic panels to which it is attached from articulating or pivoting about the joint region 620, thereby maintaining the wall section 638 in the extended configuration.

In various embodiments, the second portion 659b of the section attachment assembly is configured to attach to an adjacent wall section and/or a section attachment assembly to attach the wall section 638 to an adjacent wall section. As described herein, the wall section 638 may be attached to one or more adjacent wall sections to form the acoustic wall 612. Turning to FIG. 6C, a wall section 638a is shown attached to an adjacent wall section 638b. The wall sections 638a and 638b may be substantially analogous to any of the wall sections described herein, such as wall section 638. As shown in FIG. 6C, the wall sections 638a and 638b may be aligned along an edge such that the major surfaces 666a and 666b are coplanar and the wall sections cooperate to form a portion of the acoustic wall 612.

Figure 6D:
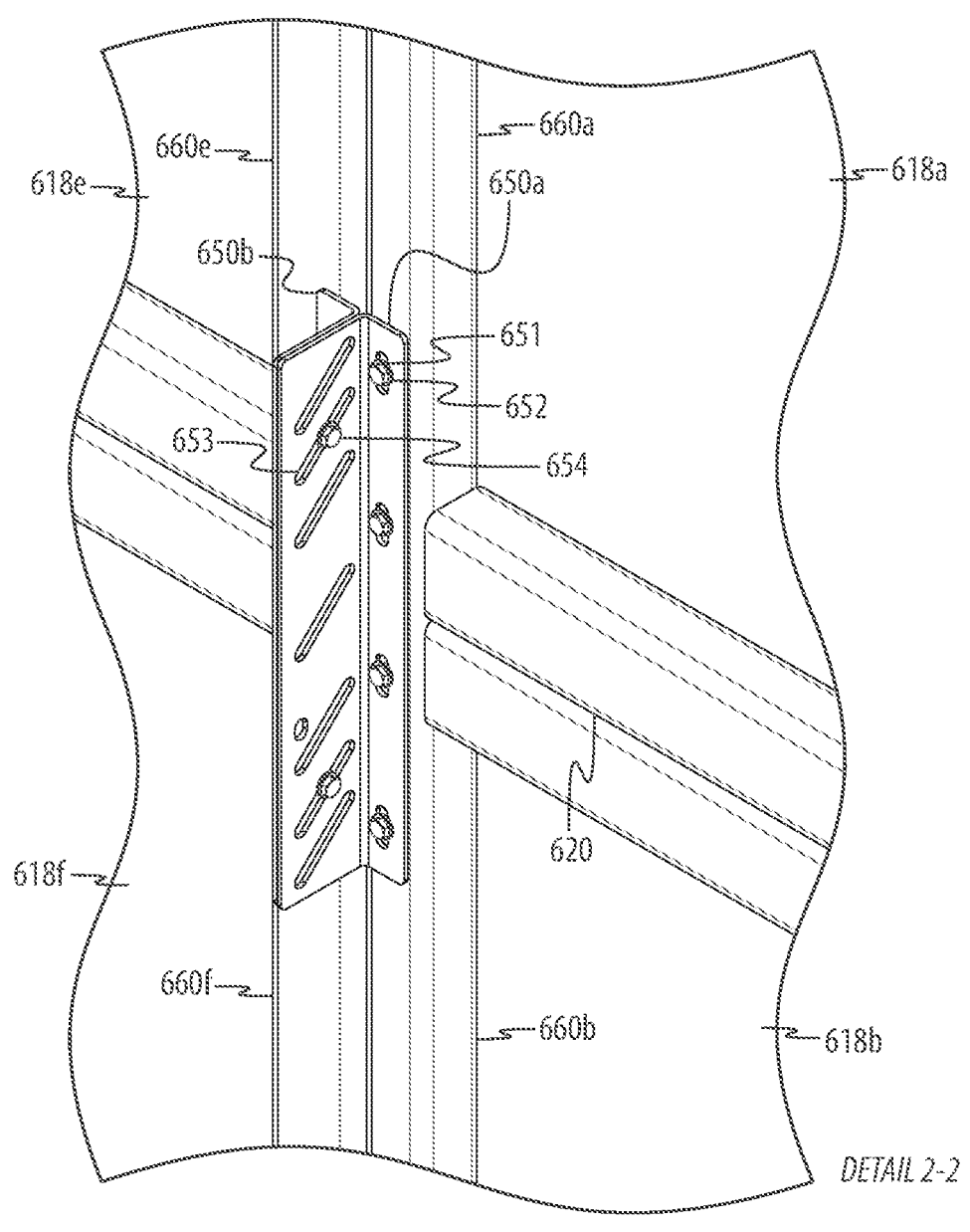

As discussed above, the wall sections 638a and 638b may be attached to one another using one or more section attachment components 650. FIG. 6D shows a shows a detail view of area 2-2 of FIG. 6C, showing a section attachment assembly 650. As shown in FIG. 6D, the section attachment component 650 includes the section attachment component 650*a* and a section attachment component 650*b*. The section attachment component 650*b* is substantially analogous to the section attachment component 650*a* discussed above, but is attached to the wall section 638*a* and is oriented in an opposite manner from the section attachment component 650*a*.

As shown in FIG. 6D, the section attachment component 650*a* defines openings 653 (e.g., slotted holes) that are configured to align with openings defined in the section attachment component 650*b*. The openings 653 may be slotted or elongated in a diagonal direction to allow for misalignment between the attachment component 650*a* and a mating section attachment component 650*b* of the adjacent wall section. The mating section attachment component 650*b* may have openings (e.g., slotted holes) that are slotted or are elongated in a second diagonal direction that is transverse to the diagonal direction of the openings 653 to allow for misalignment along two directions between adjoining wall sections. Fasteners 654 (e.g., bolts) may attach the section attachment component 650*a* to the section attachment component 650*b*, using the openings 653. The fasteners 654 may be any suitable type of fastener, such as those discussed herein. In various embodiments, the slit shape of the openings 653 allows the slits to partially align with slits of the attachment component 650*b* in a way that the aligned slits can still accept a fastener.

Figure 6E:
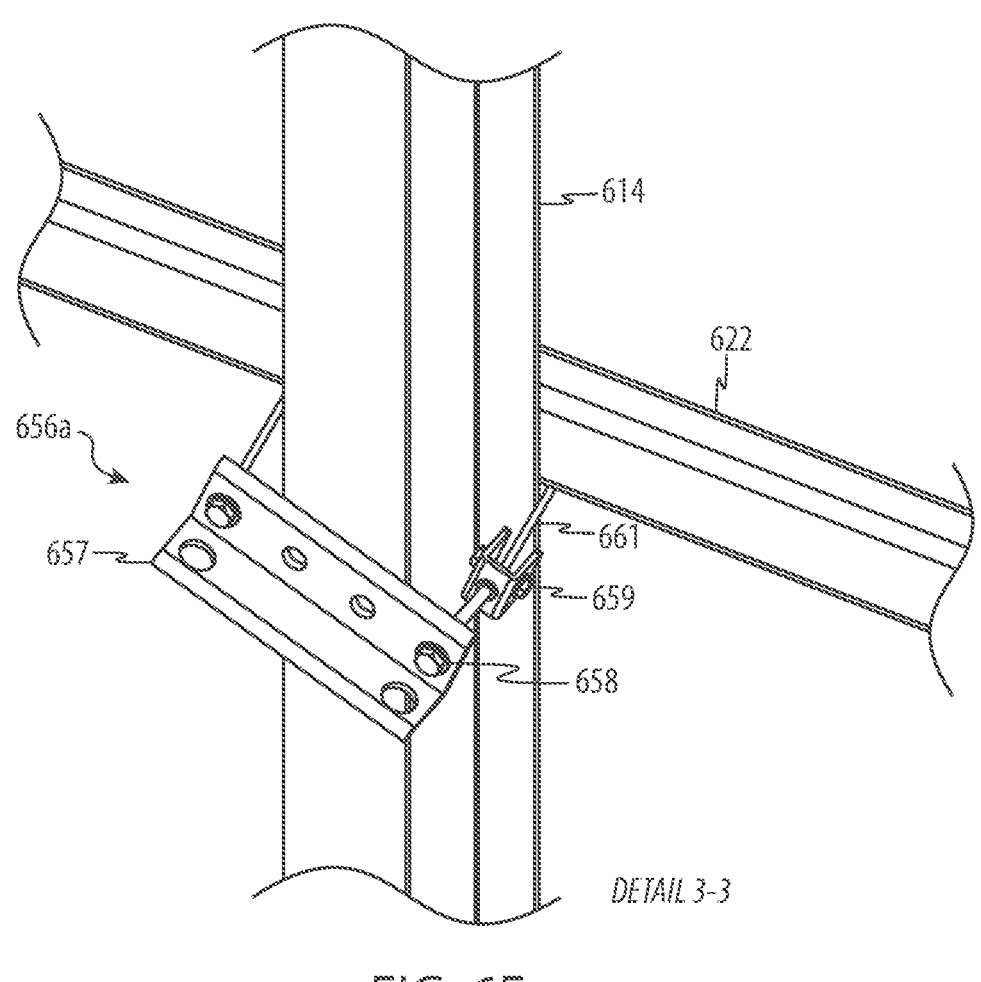

As discussed herein, wall sections may be attached to one or more structural supports. In various embodiments, wall sections are attached to structural supports using one or more support attachment assemblies. Returning to FIG. 6A, the wall section 638 is attached to the structural supports by support attachment assemblies 656. FIG. 6E shows a detail view of area 3-3 of FIG. 6A, and shows a support attachment assembly 656*a* attaching the wall section 638 to the structural support 614. As shown in FIG. 6E, the support attachment assembly 656*a* may include a bracket 657 configured to be positioned against a face or surface of the structural support 614 as shown in FIG. 6E. The support attachment assembly 656*a* further includes one or more fasteners 658, a connector 659, and a cable 661. In various embodiments, the cable 661 extends at least partially around one or more frame members (e.g., frame member 662 of a frame of the acoustic panel 618*a*) and is coupled to the bracket 657 at two locations. The components of the support attachment assembly 656*a* cooperate to form a "loop" around the structural support 614 and the one or more frame members.

In various embodiments, the fastener(s) 658 and the connectors 659 may be configured to tighten the support attachment assembly 656*a* to create a rigid attachment between the wall section 638 to the structural support 614. The fastener 658 may also be referred to as a threaded tie rod or turnbuckle. In general, the fastener 658 may be a threaded rod that is threaded using opposite-hand threads on opposing ends of the rod. A first end of the fastener 658 may be configured to engage a threaded opening or nut associated with the bracket 657 and a second end may be configured to engage with a threaded opening or nut associated with the connector 659. As the fastener 658 is rotated (e.g., rotated clockwise) the engagement of the threads causes the distance between the connector 659 and the bracket 657 to decrease, thereby tightening the support attachment assembly 656*a* around the structural support 614 and the corresponding elements of the wall section 638. As such, the fastener 658 may be tightened into the connector 659 to tighten the loop and secure the wall section 638 to the structural support 614. In various embodiments, the fastener 658 may be counter-rotated (e.g., rotated counterclockwise) and the engagement of the threads causes the connector 659 to loosen the support attachment assembly 656*a*. In some embodiments, the fastener 658 may be completely removed from the connector 659, thereby enabling the support attachment assembly 656*a* to be installed or removed from the acoustic wall.

Figure 6F:
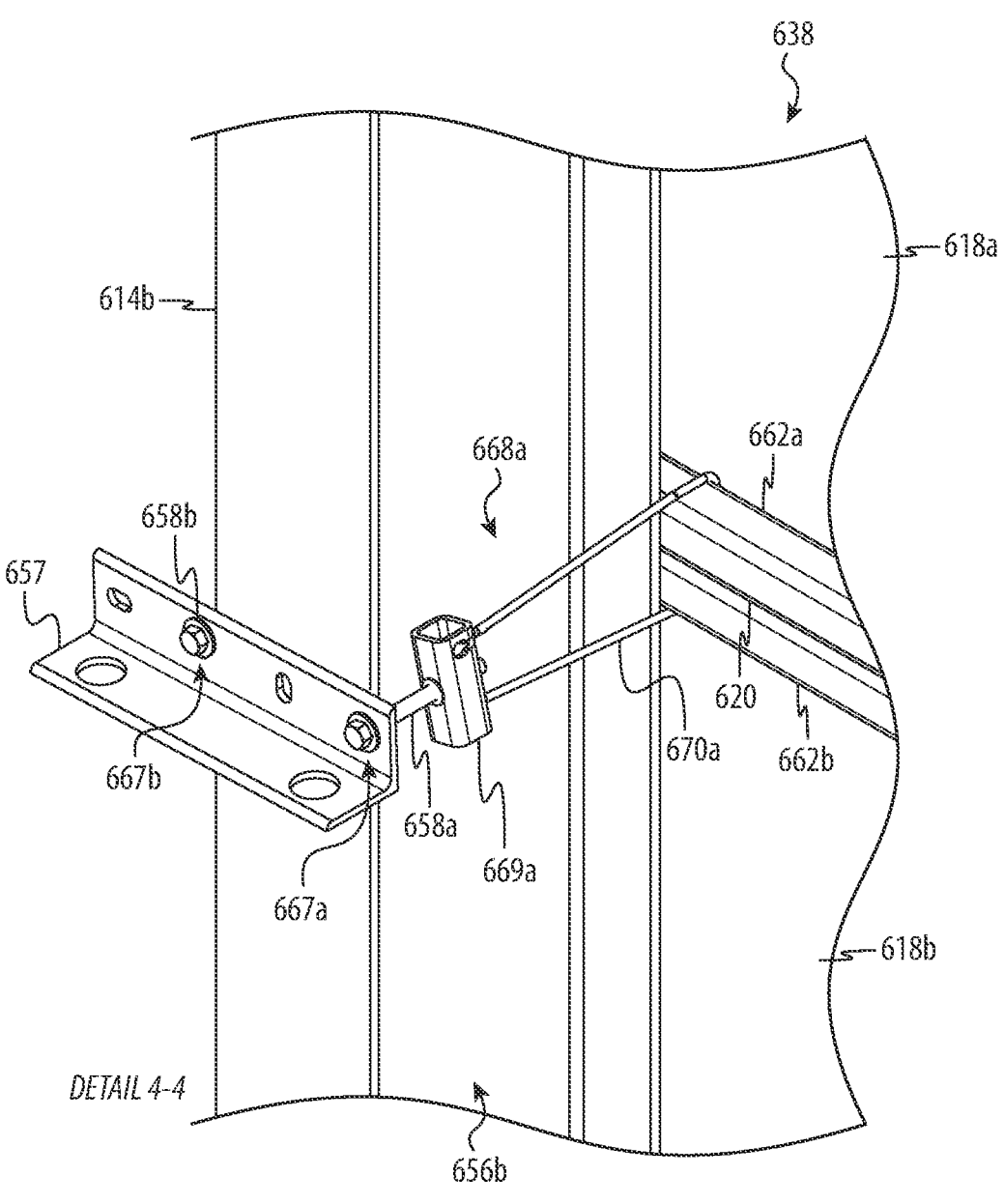

FIG. 6F shows a detail view of area 4-4 of FIG. 6A, and shows another embodiment of a support attachment assembly 656*b* for securing (e.g., attaching) the wall section 638 to a structural support having a fixed end and extending vertically from a foundation, such as the structural support 614*b*. The support attachment assembly 656*b* includes a bracket 657 configured to be positioned against a surface the structural support 614*b* as shown in FIG. 6F. The support attachment assembly 656*b* further includes one or more attachment mechanisms (e.g., attachment mechanism 668*a*) configured to cooperate with the bracket 657 to secure the wall section 638 to the structural support 614*b*. The support attachment assembly 656*b* may include multiple attachment mechanisms configured to cooperate with one another and/or the bracket 657 to secure the wall section 638 to the structural support 614*b*. For example, as shown, a first attachment mechanism 668*a* may attach the bracket 657 to the wall section 638 on a first side of the structural support 614*b* and a second attachment mechanism 668*b* (shown in FIG. 7A) may attach the bracket 657 to the wall section 638 on a second side of the structural support 614*b*. The attachment mechanisms 668 cooperate with the bracket 657 to create a rigid attachment between the wall section 638 and the structural support 614*b*.

Figure 7A:
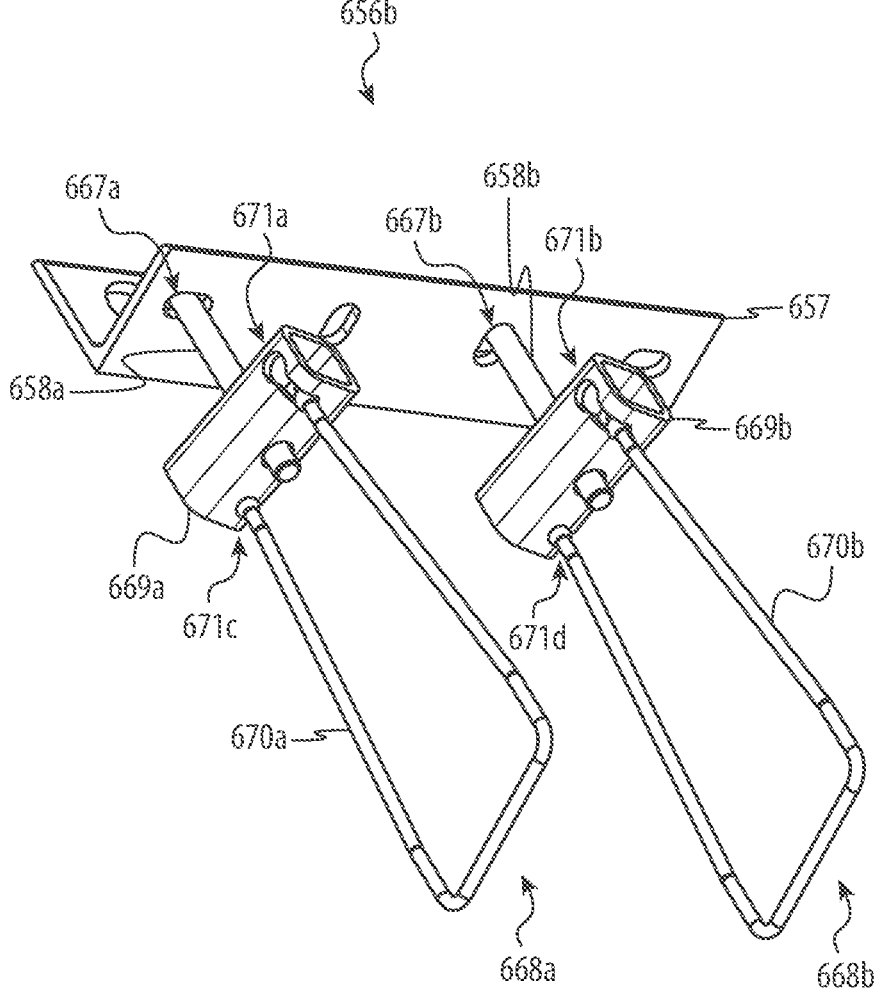
FIGS. 7A-7B show an example support attachment assembly.

FIG. 7A shows the support attachment assembly 656*b*, including the bracket 657, the first attachment mechanism 668*a*, and the second attachment mechanism 668*b*. Each attachment mechanism 668*a*, 668*b* includes a fastener (e.g., fasteners 658*a*, 658*b*), a connector (e.g., connectors 669*a*, 669*b*), and a cable (e.g., cables 670*a*, 670*b*). Each fastener couples a corresponding connector with the bracket 657 using openings 667*a*, 667*b* defined in the bracket. In some cases, the openings 667*a*, 667*b* may be threaded and/or the fastener may cooperate with a nut to secure the fastener to the bracket 657. Each cable 670*a*, 670*b* is configured to be removably coupled with (e.g., removably retained by) a connector 669*a*, 669*b*. In some embodiments, each of the cables 670*a*, 670*b* is a steel wire rope having intertwined steel wires. The cables 670*a*, 670*b* may be encapsulated or coated in a sheath or coating layer.

As shown in FIG. 7A, first and second ends of each cable are configured to be removably coupled with a connector to form a closed loop. Each connector 669*a*, 669*b* may define first and second openings (e.g., openings 671*a-d*). Each cable 670*a*, 670*b* may include coupling features at each end that are configured to couple the cable to a connector. For example, the coupling feature may be retained in an opening of the connector as shown and described with respect to FIG. 7B. The coupling feature may be removably retained in the opening of the connector. As used herein, "removably retained" may refer to components that may be detached or decoupled without damage or deformation to the components such that they may be reused and/or reconnected multiple times.

Figure 7B:
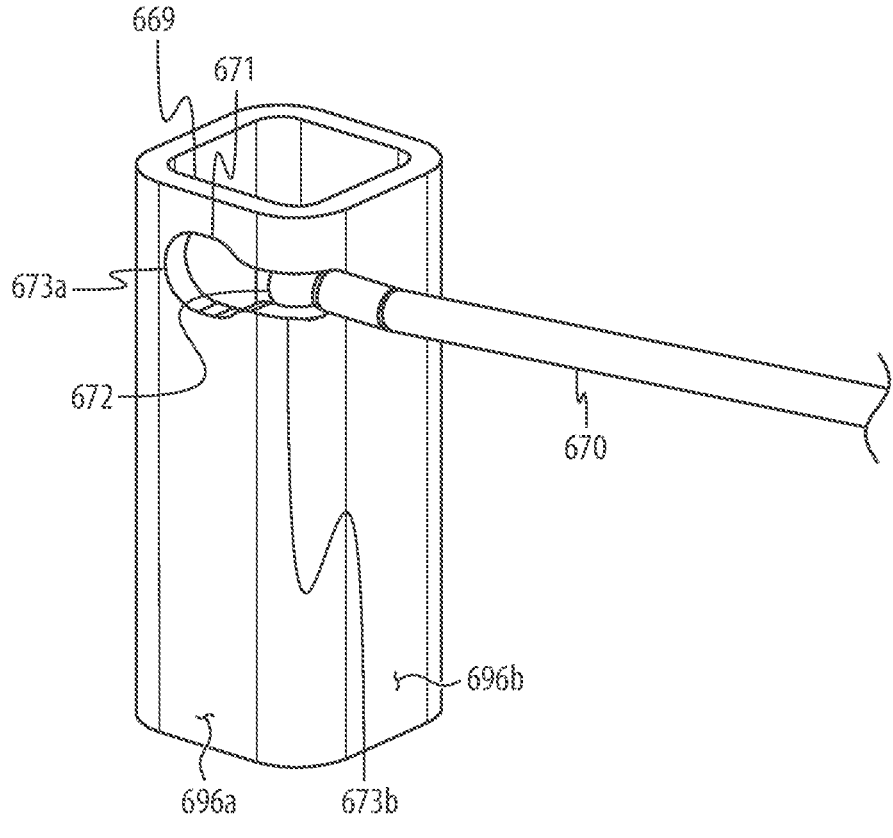

Turning now to FIG. 7B, an example cable 670 is shown removably retained with an example connector 669. In some embodiments, the connector 669 defines one or more openings 671 that may be shaped to include a wide portion 673*a* and a narrow portion 673*b*. The wide portion 673*a* may have a width greater than a width of the narrow portion 673*b*. The cable 670 may include coupling features (e.g., coupling feature 672) at each end that have a width greater than the width of the narrow portion 673*b* of the opening 671, but less than the width of the wide portion 673*a*. As such, the coupling feature 672 may pass into an interior of the connector 669 through the wide portion 673*a*, but may be retained in the interior of the connector 669 by the narrow portion 673*b*. Therefore, the cable 670 may be removably retained by the connector 669, thereby removably coupling the cable 670 and the connector 669.

In some embodiments, each end of each cable 670 includes a coupling feature 672, and each connector 669 includes two openings 671 configured to retain each end of the cable 670. For example, a narrow portion of a first opening of a connector may be configured to retain a first coupling feature on a first end of a cable, and a narrow portion of a second opening of the connector may be configured to retain a second coupling feature on a second end of the cable, thereby forming a closed loop, for example as shown in FIG. 7A. In some cases, the coupling feature(s) of a cable may have a width greater than an intermediate portion of the cable disposed between the coupling features. In some cases, the coupling feature 672 may be a ball as shown in FIG. 7B, and the width of the ball is greater than a width of the rest of the cable 670. In some embodiments, the coupling feature is crimped to the end of the cable 670.

In some embodiments, the connector 669 may define multiple external surfaces. The openings 671 may extend along two or more external surfaces of the connector 669. In some cases, the wide portion 673*a* is at least partially defined on a first external surface and the narrow portion 673*b* is at least partially defined on a second external surface, such as shown in FIG. 7B. For example, the connector 669 may include a first sidewall 696*a* defining a first external surface and a second sidewall 696*b* defining a second external surface. At least a portion of the wide portion 673*a* may be defined in the first sidewall 696*a*, and at least a portion of the narrow portion 673*b* may be defined in the second sidewall 696*b*.

As shown in FIG. 6F, each cable (e.g., cables 670*a* and 670*b*) is configured to extend at least partially around one or more components of the wall section 638 (e.g., a frame member 662*a* of a frame of the acoustic panel 618*a* and a frame member 662*b* of a frame of the acoustic panel 618*b* as shown in FIG. 6F). As discussed above, each cable 670*a*, 670*b* may be removably coupled to the corresponding connector (e.g., connectors 669*a* and 669*b*) to form a closed loop that may be used to couple the closed loop to the wall section 638. For example, the closed loop may extend around a component such as a frame member. As discussed above, the fasteners 658*a*, 658*b* couple each connector 669*a*, 669*b* to the bracket 657, thereby coupling the closed loops to the bracket 657.

As discussed above, in some embodiments, the attachment mechanism 668*a* is configured to attach the bracket 657 to the wall section 638 on a first side of the structural support 614 and a second attachment mechanism 668*b* (shown in FIG. 7A) is configured to attach the bracket 657 to the wall section 638 on a second side of the structural support 614. In various embodiments, the attachment mechanisms 668*a*, 668*b* cooperate to draw the wall section 638 against a surface of the structural support 614 (e.g., a surface opposite the surface having the bracket 657). For example, the attachment mechanisms and the bracket may cooperate with the wall section to exert a compressive force on the structural support. This may allow for a rigid attachment between the wall section 638 and the structural support 614. In some cases, the fastener(s) may be adjustable to change the compressive force exerted on the structural support. Each attachment mechanism 668*a*, 668*b* may be independently adjustable from one another to allow for easier installation and adjustment. The bracket 657 may be positioned such that the first opening 667*a* is offset from the first side of the structural support 614 when the bracket 657 is positioned against the structural support 614 and the second opening 667*b* is offset from the second side of the structural support 614 when the bracket 657 is positioned against the structural support 614. In some embodiments, the fasteners 658*a*, 658*b* couple each connector 669*a*, 669*b* to the bracket 657 using the openings 667. As discussed above, each of the fasteners 658*a*, 658*b* may also be referred to as a threaded tie rod or turnbuckle. In general, each fastener 658*a*, 658*b* may be a threaded rod that is threaded using opposite-hand threads on opposing ends of the rod. A first end of the fastener 658 may be configured to engage a threaded opening or nut associated with the bracket 657 and a second end may be configured to engage with a threaded opening or nut associated with the connector 669*a*, 669*b*. As the fastener 658*a* or 658*b* is rotated (e.g., rotated clockwise) the engagement of the threads causes the distance between the connector 669*a*, 669*b* and the bracket 657 to decrease, thereby tightening the support attachment assembly 656*b* around the structural support 614 and the corresponding elements of the wall section 638. As discussed above, each attachment mechanism 668*a*, 668*b* may be independently adjustable from one another to allow for easier installation and adjustment. As such, each fastener 658*a*, 658*b* may be tightened into the connector 669*a*, 669*b* to tighten the corresponding cable loop. The attachment mechanisms 668*a*, 668*b* may cooperate to secure the wall section 638 to the structural support 614. In various embodiments, the fasteners may be counter-rotated (e.g., rotated counterclockwise) and the engagement of the threads causes the connector to loosen the support attachment assembly 656*b*. As shown in FIGS. 6E and 6F, the support attachment assemblies used to attach wall sections to structural supports may vary. In some embodiments, a single type of support attachment assembly is used. In some embodiments, multiple types of support attachment assemblies are used.

Figure 8A:
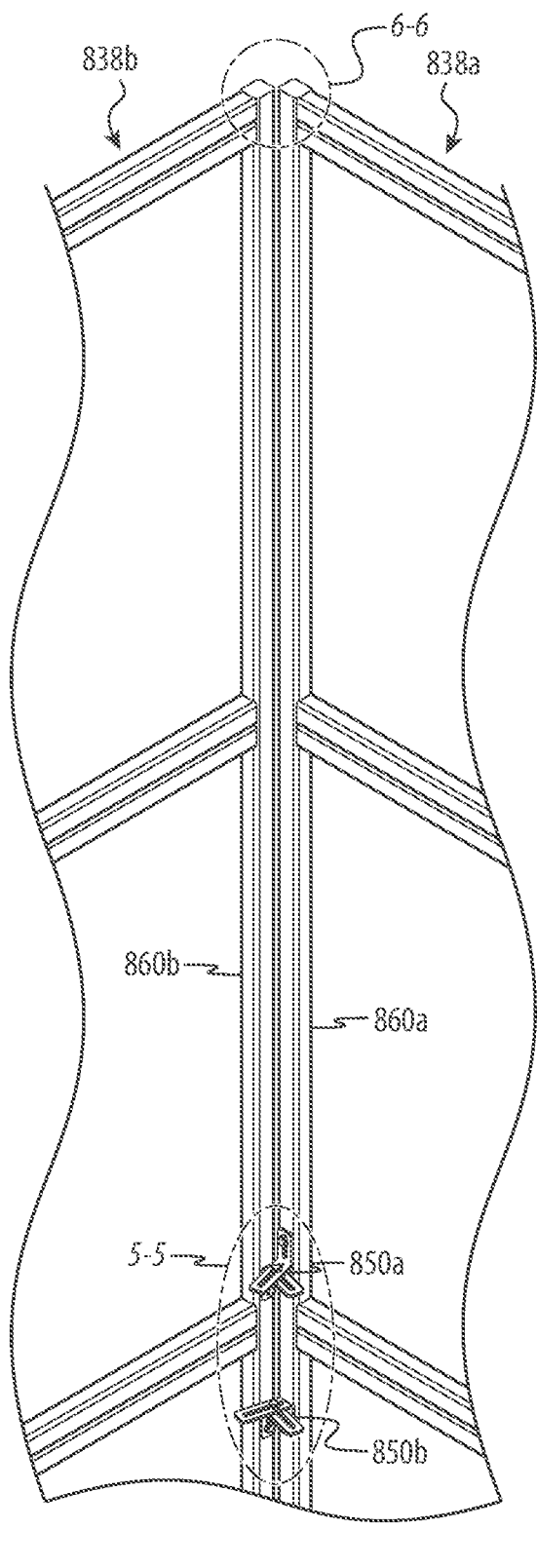
FIGS. 8A-9B show example corner attachment assemblies for attaching adjacent wall sections at a corner.

As described above, wall sections may be attached to form a coplanar surface. In some embodiments, wall sections may be attached to form a corner or other angled portion of an acoustic wall. FIGS. 8A-9B show example corner attachment assemblies for attaching adjacent wall sections at a corner. FIG. 8A shows corner attachment assemblies 850*a* and 850*b* for attaching adjacent wall sections 838*a* and 838*b* to form a corner of an acoustic wall. For example, as shown in FIG. 8A, the corner attachment assemblies may be attached to frames 860*a* and 860*b* of the wall sections 838*a* and 838*b*.

Figure 8B:
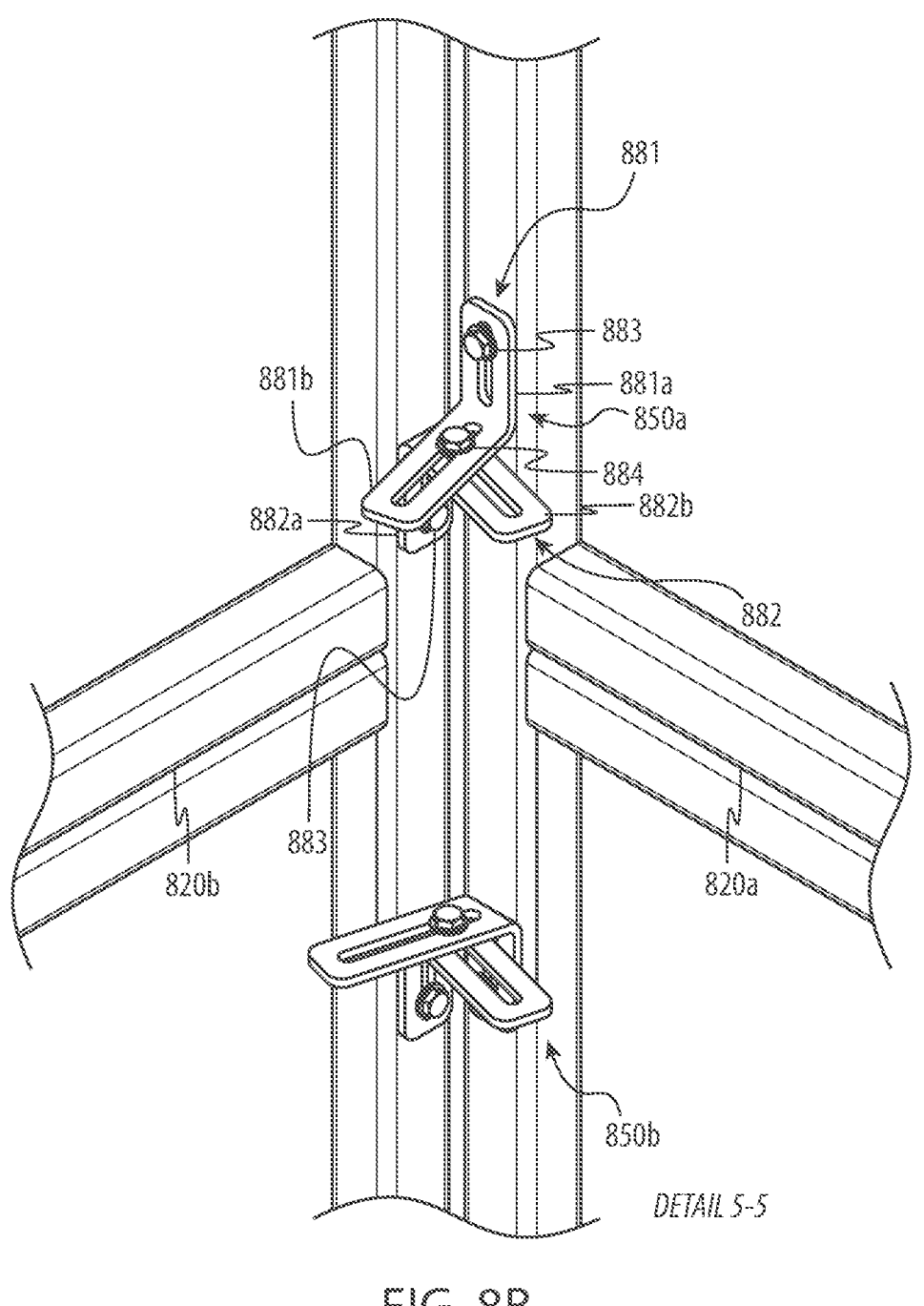

FIG. 8B is a detail view of area 5-5 of FIG. 8A showing the corner attachment assemblies 850*a* and 850*b*. In some embodiments, each corner attachment assembly 850 includes a pair of brackets (e.g., brackets 881 and 882). Each bracket is attached to a wall section, and the brackets are attached to each other to attach the wall sections together. For example, a first portion 881*a* of bracket 881 is attached to wall section 838*a* and a first portion 882*a* of bracket 882 is attached to wall section 838*b*.

The brackets may be attached to the wall sections using any suitable method or mechanism, including fasteners, welding, brazing, and the like. In some embodiments, the brackets are attached using fasteners 883 (e.g., a bolt). Each fastener 883 passes through an opening in the bracket and an opening in the wall section and secures the bracket to the wall section. In various embodiments, the openings in the bracket and/or the openings in the wall section may be threaded and/or include a nut insert to engage a fastener. In some embodiments, the fasteners cooperate with a nut to secure the fastener in the opening. A second portion 881*b* of the bracket 881 may attach to a second portion 882*b* of the bracket 882, thereby attaching the wall section 838*a* to the wall section 838*b*. The brackets may be attached to one another using any suitable method or mechanism, including fasteners, welding, brazing, and the like. In some embodiments, the brackets are attached using fasteners 884 (e.g., a bolt). Each fastener 884 passes through an opening in each bracket and may be secured using a nut to secure the brackets together. The openings in the bracket 882 may be slotted or elongated to allow for misalignment or a range of alignments between the brackets 881 and 882.

Figure 8C:
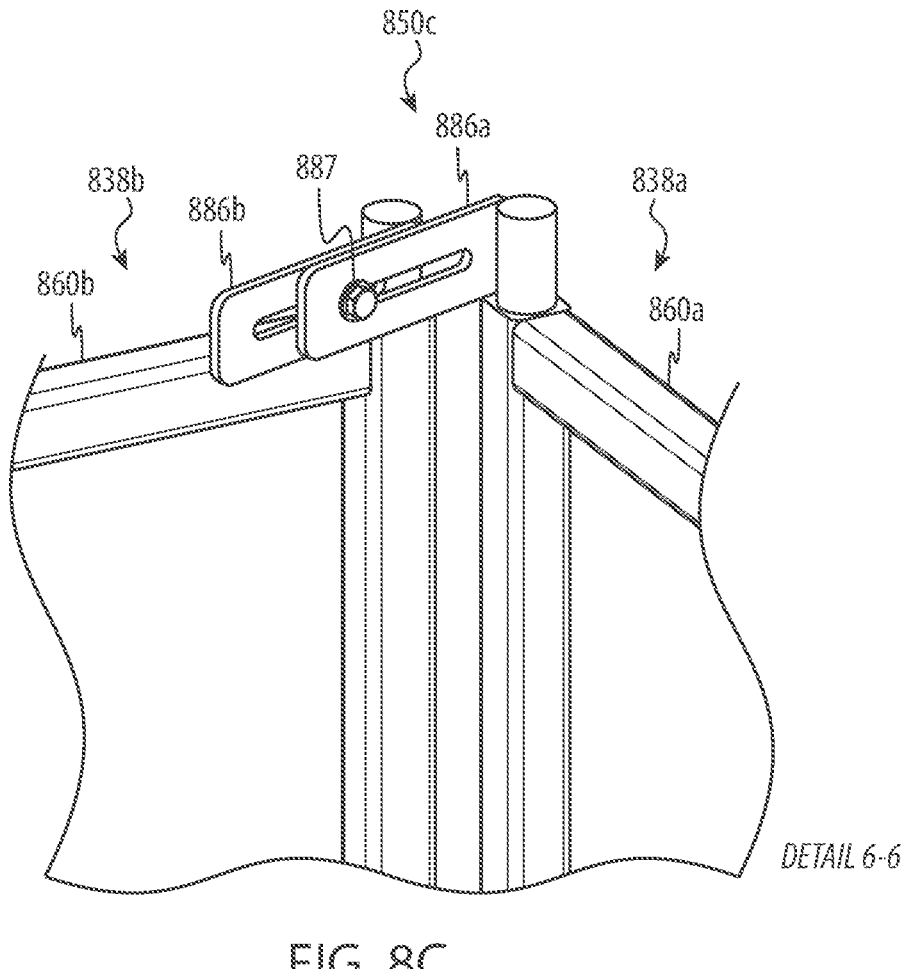

FIG. 8C is a detail view of area 6-6 of FIG. 8A showing another embodiment of a corner attachment assembly 850*c*. As shown in FIG. 8C, the corner attachment assembly 850*c* may include a first member 886*a* rotatably coupled to a top edge of the wall section 838*a* and a second member 886*b* rotatably coupled to a top edge of the wall section 838*b*. In various embodiments, each of the members 886*a* and 886*b* may include a pivot portion and a plate that extends from the pivot portion. Each plate may define first and second surfaces and an opening. The first and second members 886*a*, 886*b* may be rotated such that the openings in the plates are aligned and a surface of the plate of the first member 886*a* contacts a surface of the plate of the second member 886*b*. A fastener 887 (e.g., a threaded fastener) may pass through both openings and be secured with a nut or other fastener to secure the first and second members 886*a*, 886*b* to one another, thereby securing the wall sections 838*a* and 838*b*.

Figure 8D:
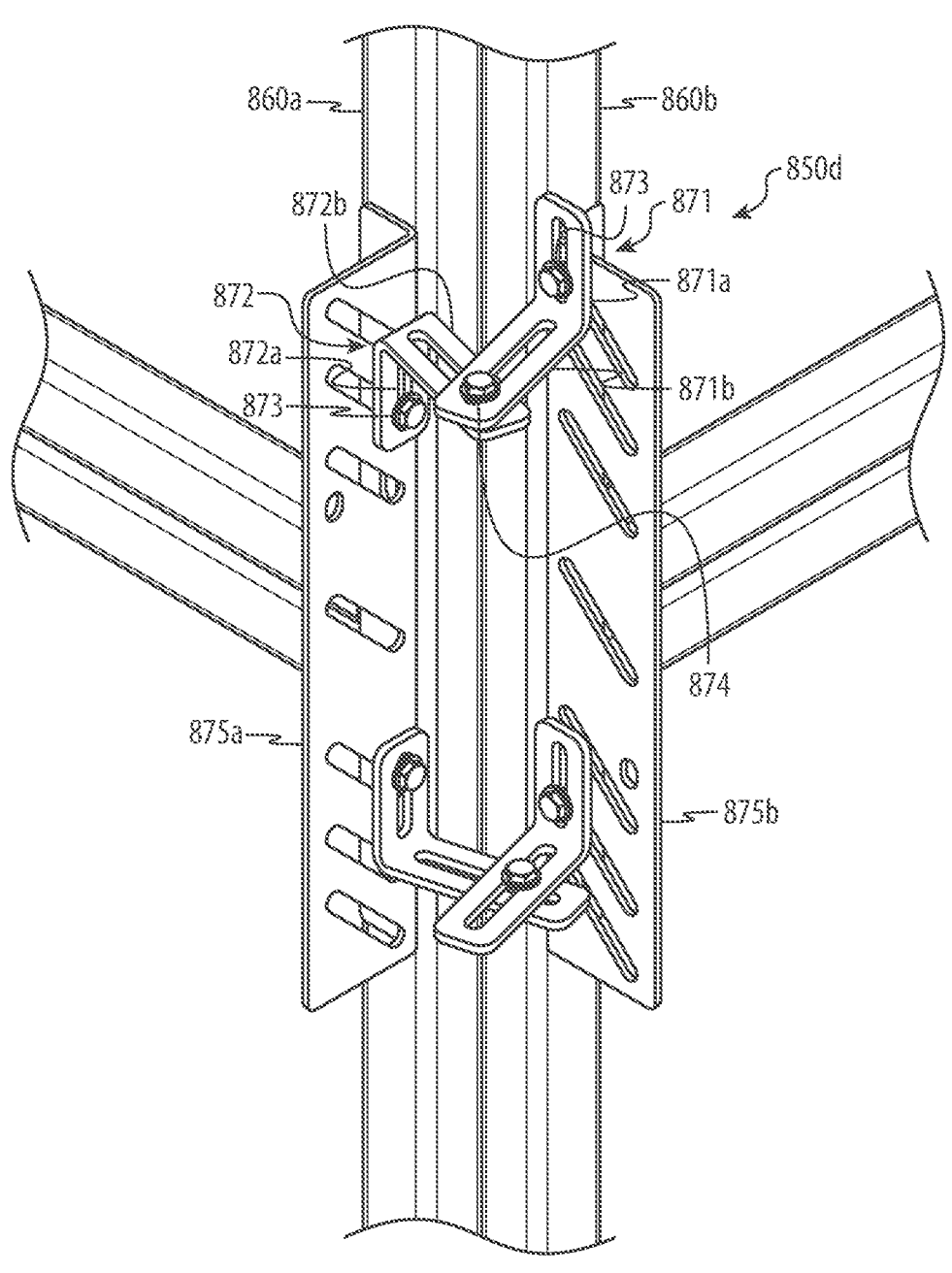

FIG. 8D shows a detail view of an exterior corner attachment assembly 850*d*. The exterior corner attachment assembly 850*d* may include brackets 871, 872 that function similarly to the brackets 881, 882 discussed above with respect to FIG. 8B. The brackets may be attached to the wall sections using additional brackets 875*a*, 875*b* as shown in FIG. 8D. The additional brackets may be attached to the wall sections 838*a*, 838*b* using any suitable fastening mechanism, such as one or more fasteners. The brackets 871, 872 may be attached using a fastener 874 similar to the fastener 884 discussed above with respect to FIG. 8B, thereby attaching the wall sections together.

Figure 9A:
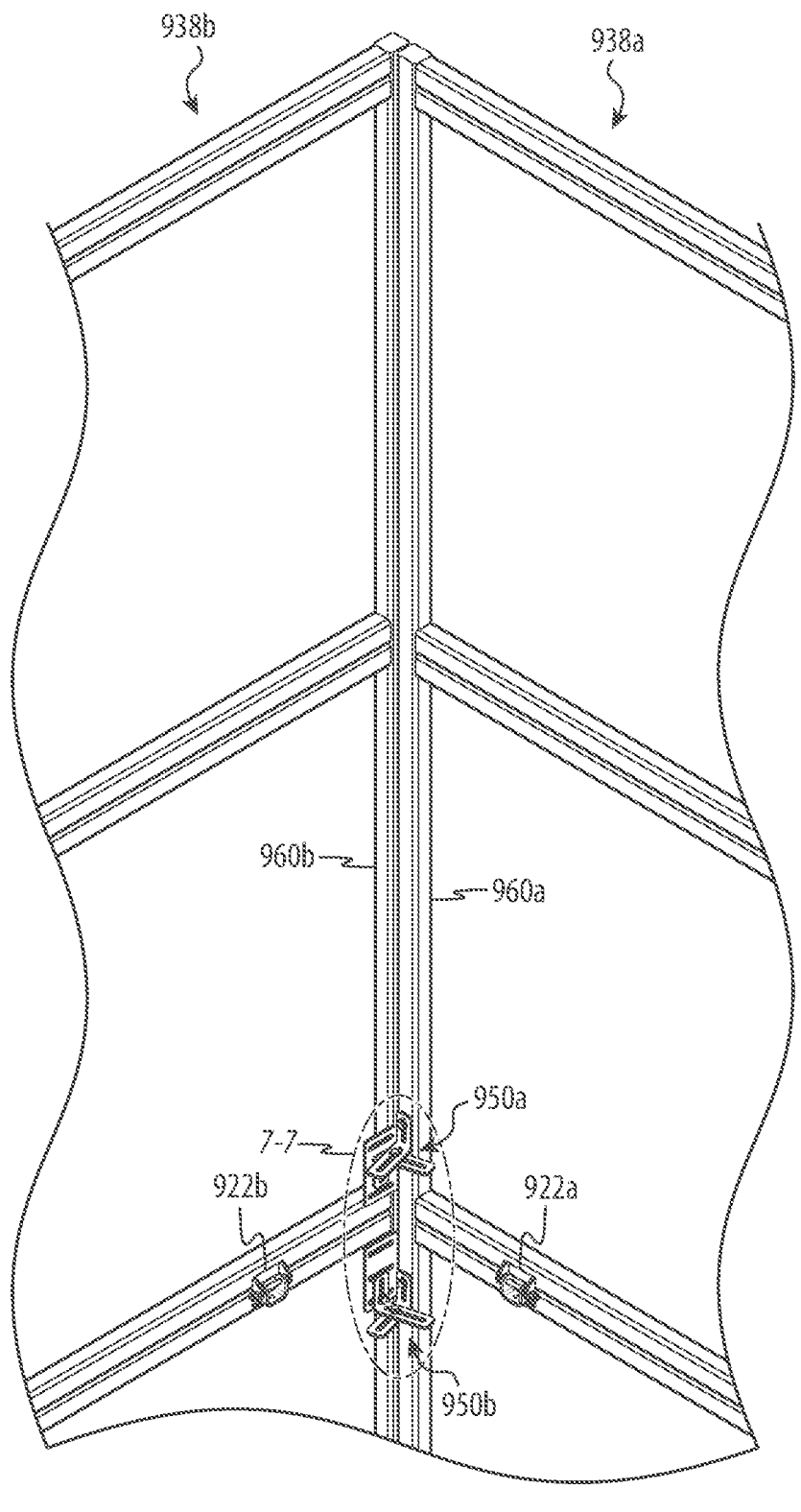
Figure 9B:
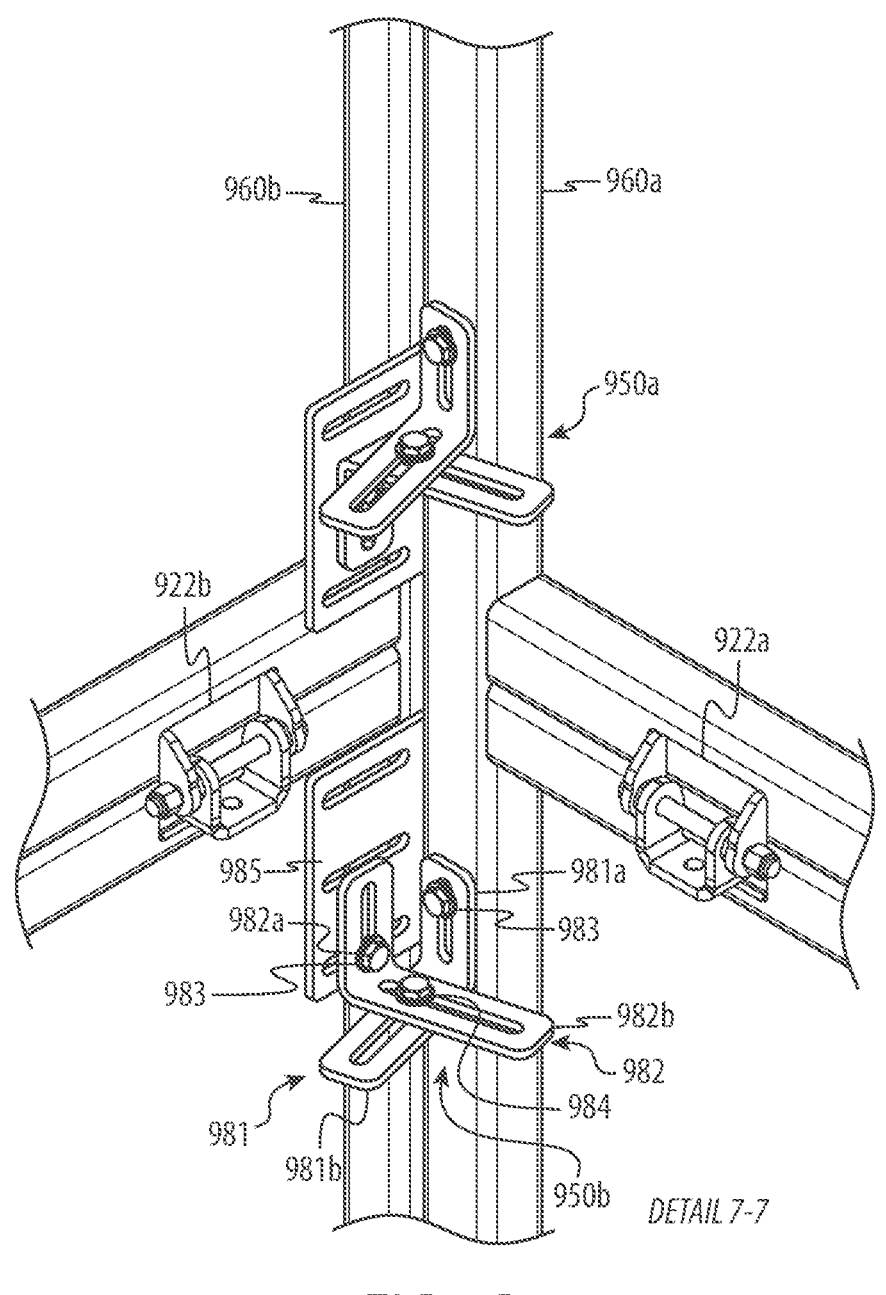

FIGS. 9A and 9B show an additional embodiment of corner attachment assemblies 950*a* and 950*b*. FIG. 9A shows corner attachment assemblies 950*a* and 950*b* for attaching adjacent wall sections 938*a* and 938*b* to form a corner of an acoustic wall. For example, as shown in FIG. 9A, the corner attachment assemblies may be attached to frames 960*a* and 960*b* of the wall sections 938*a* and 938*b*.

FIG. 9B is a detail view of area 7-7 of FIG. 9A showing the corner attachment assemblies 950*a* and 950*b*. In some embodiments, each corner attachment assembly 950 includes a pair of brackets (e.g., brackets 981 and 982). Each bracket is attached to a wall section, and the brackets are attached to each other to attach the wall sections together. In some embodiments, one or more brackets may be attached to a wall section using a plate or other intermediate member. For example, a first portion 981*a* of bracket 981 is attached to wall section 938*a* and a first portion 982*a* of bracket 982 is attached to a plate 985 that is attached to the wall section 938*b*.

The brackets and plates may be attached to the wall sections using any suitable method or mechanism, including fasteners, welding, brazing, and the like. In some embodiments, the brackets are attached using fasteners 983 (e.g., a bolt). Each fastener 983 passes through an opening in the bracket and an opening in the wall section or plate and secures the bracket to the wall section. In various embodiments, the openings in the bracket and/or the openings in the wall section may be threaded and/or include a nut insert to engage a fastener. In some embodiments, the fasteners cooperate with a nut to secure the fastener in the opening. A second portion 981*b* of the bracket 981 may attach to a second portion 982*b* of the bracket 982, thereby attaching the wall section 938*a* to the wall section 938*b*. The brackets may be attached to one another using any suitable method or mechanism, including fasteners, welding, brazing, and the like. In some embodiments, the brackets are attached using fasteners 984 (e.g., a bolt). Each fastener 984 passes through an opening in each bracket and may be secured using a nut to secure the brackets together.

Figure 10:
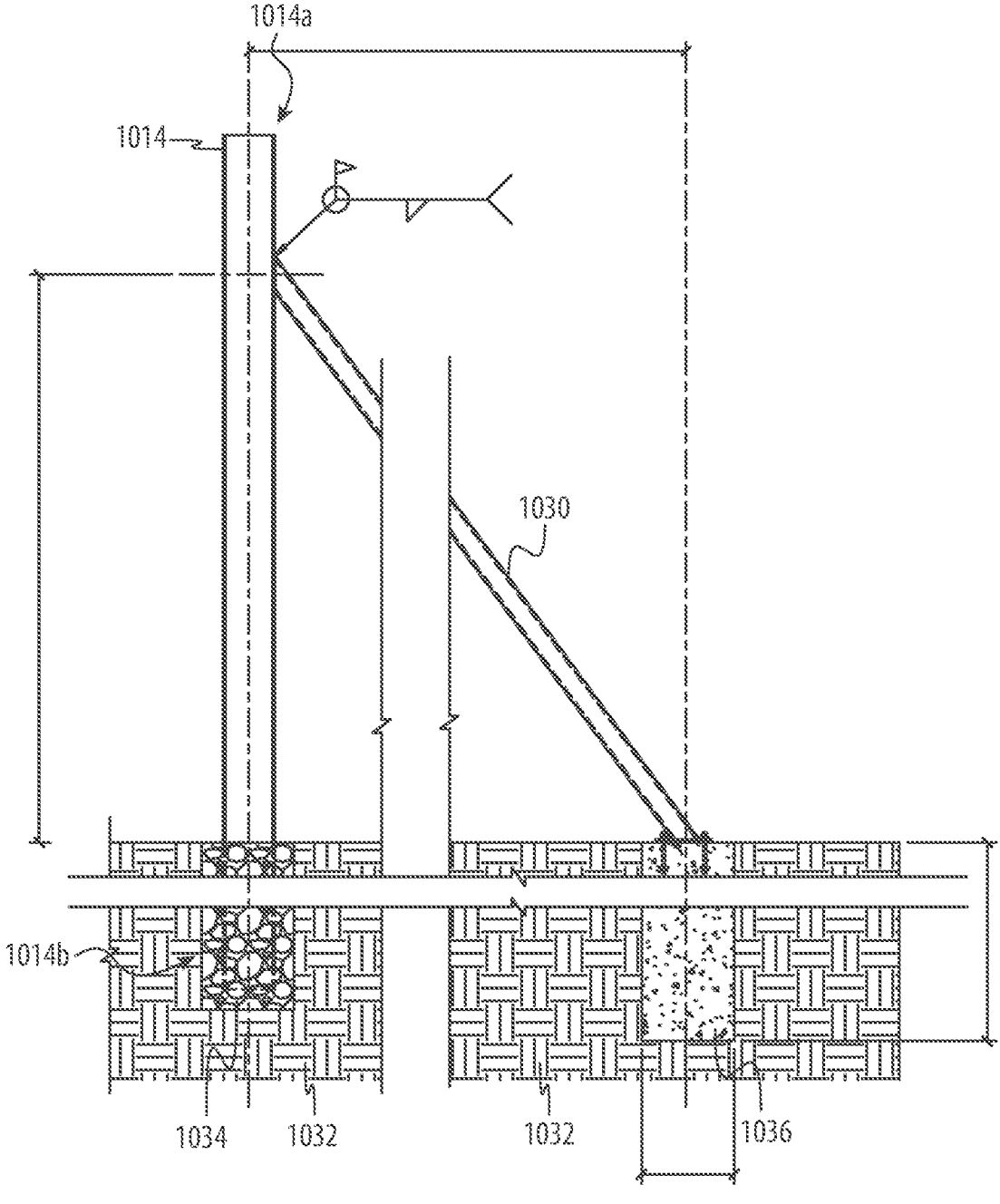
FIG. 10 shows example structural supports for an acoustic wall.

FIG. 10 shows an example structural support 1014 for an acoustic wall, such as those described herein. It will be appreciated that the structural support 1014 may be substantially analogous to the structural supports (e.g., structural supports 114, 414, 614) described above with respect to FIGS. 1-7. For example, the structural support 1014 may cooperate with additional structural supports, wall sections, and the like to form a part of an acoustic wall used to form an acoustic barrier between an industrial worksite and an environment.

In various embodiments, the structural support 1014 includes a free end 1014*a* and a fixed end 1014*b*. The fixed end 1014*b* may be embedded (e.g., anchored, driven, or otherwise fixed) in a foundation 1032. As discussed above, as used herein, "foundation" may refer to a dedicated foundation or footing (e.g., a concrete, gravel, or other foundation), the ground (e.g., soil, rock), and/or any other suitable body or opening in which the structural supports may be disposed.

As shown in FIG. 10, in some embodiments, an additional support 1030 is coupled or otherwise attached to the structural support 1014 to provide additional support for the structural support 1014 and the acoustic wall. For example, the additional support 1030 may be configured as a "dead man" support that includes an end fixed with respect to the foundation and an end coupled to the structural support 1014. In some embodiments, the additional support 1030 may improve the performance of the acoustic wall, for example, by increasing the maximum lateral load (e.g., wind load) that may be placed on the structure.

In some embodiments, the structural support 1014 (e.g., the fixed end 1014*b*) and/or the additional support 1030 are embedded in a base 1034 positioned within or otherwise attached to the foundation 1032. For example, as shown in FIG. 10, the base 1034 may include gravel positioned in a hole in the foundation 1032. In various embodiments, the structural support 1014 (e.g., the fixed end 1014*b*) and/or the additional support 1030 may be fixed with respect to the foundation in a variety of ways. For example, as shown in FIG. 10, the supports 1014, 1030 may be coupled to a base 1036 at or near a surface of the ground by an attachment mechanism, such as an anchor rod.

The structural support 1014 and the additional support 1030 may be structural beams (e.g., I-beams), posts, columns, or any other appropriate structure configured to secure the wall sections in an extended configuration. In some embodiments, the structural support 1014 and/or the additional support 1030 are constructed from metal, such as steel.

Figure 11:
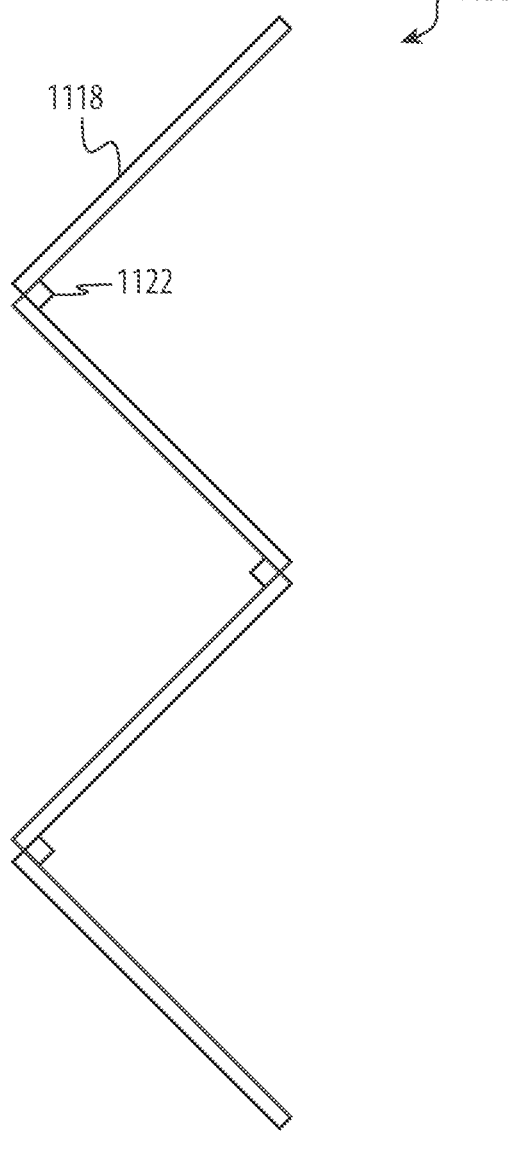
FIGS. 11-13 show simplified views of example wall sections and attachment mechanisms for coupling the panels of the wall sections.
Figure 12:
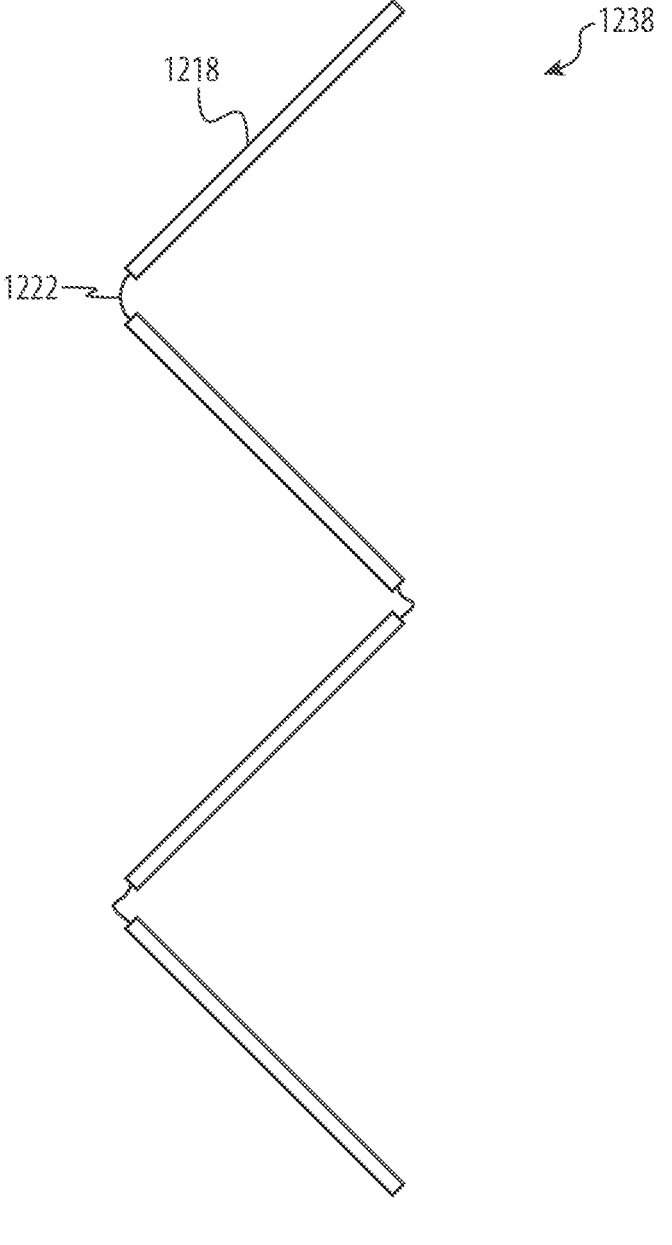
Figure 13:
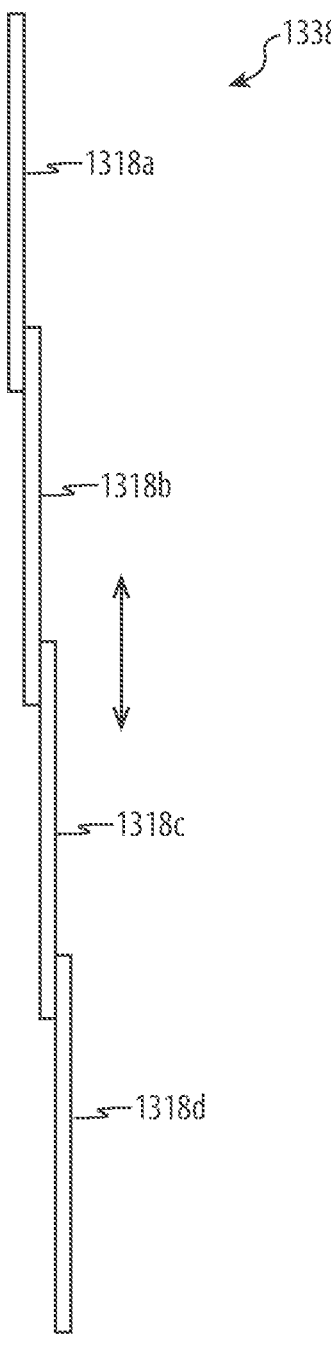

In various embodiments, the panels that make up a wall section may be coupled in a variety of ways. FIGS. 11-13 show simplified views of example wall sections and attachment mechanisms for coupling the panels of the wall sections. It will be appreciated that the wall sections shown in FIGS. 11-13 may be substantially analogous to the wall sections described above with respect to FIGS. 1-9. For example, the wall sections may form a part of an acoustic wall used to form an acoustic barrier between an industrial worksite and an environment.

FIG. 11 shows a wall section 1138 having panels 1118 connected by joining mechanisms 1122. As shown in FIG. 11, joining mechanisms (e.g., hinges) along adjacent panel joints may be positioned on opposing sides of the wall section 1138 to facilitate the alternated folding discussed above. The joining mechanisms 1122 may be any suitable mechanism for pivotally coupling the panels 1118, such as hinges. As discussed above, the wall section 1138 may be configured to transition from an unextended configuration to an extended configuration.

In the unextended configuration, the panels 1118 may be stacked, similar to the panels shown in FIG. 3A. In the extended configuration, the panels 1118 may be aligned to form a substantially planar wall section, such as the arrangement shown in FIG. 3C. In FIG. 11, the wall section 1138 is shown in a partially extended configuration between the unextended configuration and the extended configuration.

FIG. 12 shows a wall section 1238 having panels 1218 connected by joining mechanisms 1222. As shown in FIG. 12, the joining mechanisms 1222 may couple the panels 1218 along their edges. The joining mechanisms 1222 may be any suitable mechanism for flexibly or movably coupling the panels 1218, such as flexible members. In some embodiments, the joining mechanisms 1222 are wires or cables that allow the panels 1218 to move relative to one another. As discussed above, the wall section 1238 may be configured to transition from an unextended configuration to an extended configuration. In the unextended configuration, the panels 1218 may be stacked, similar to the panels shown in FIG. 3A. In the extended configuration, the panels 1218 may be aligned to form a substantially planar wall section, such as the arrangement shown in FIG. 3C. In FIG. 12, the wall section 1238 is shown in a partially extended configuration between the unextended configuration and the extended configuration.

FIG. 13 shows a wall section 1338 having panels 1318 configured to translate relative to one another to transition from an unextended configuration to an extended configuration. As discussed above, the wall section 1338 may be configured to transition from an unextended configuration to an extended configuration. In the unextended configuration, the panels 1318 may be stacked, similar to the panels shown in FIG. 3A. In the extended configuration, the panels 1318 may be aligned to form a substantially planar wall section, such as the arrangement shown in FIG. 3C. In FIG. 13, the wall section 1338 is shown in a partially extended configuration between the unextended configuration and the extended configuration. During the transition from the unextended configuration to the extended configuration, the panels 1318 may be configured to translate or slide relative to one another using one or more joining mechanisms, such as rails or the like. In some embodiments, the translation of the panels 1318 is limited to movement along a single direction, such as up and down with respect to FIG. 13.

Figure 14:
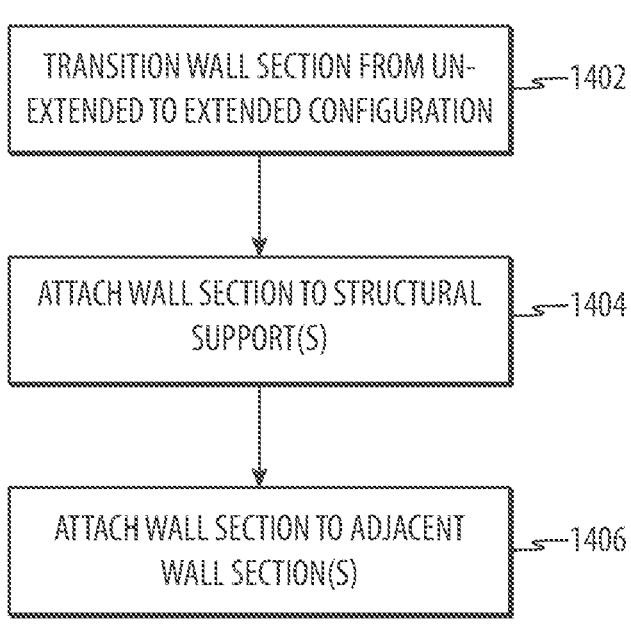
FIG. 14 depicts a flow diagram of a method of assembling an acoustic wall for an industrial worksite.

To facilitate the reader's understanding of the various functionalities of the embodiments discussed herein, reference is now made to the flow diagram in FIG. 14, which illustrates process 1400. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 14, method 1400 relates generally to assembling an acoustic wall for an industrial worksite. The method 1400 may be used to form or manufacture any of the mitigation walls described herein, for example, such as acoustic walls 112, 412, 612, and variations and embodiments thereof.

At operation 1402, a wall section may be transitioned from an unextended configuration to an extended configuration. For example, a wall section may be extended by applying a lifting force along a top edge of a first panel. For example and with reference to FIGS. 3A-3C, a lifting force F may be received along a top edge of a first acoustic panel 318a. The top edge may include a series of lug plates 330, and the force may be received at one or more of the series of lug plates 330. The lifting force F causes the set of acoustic panels 318 to unfold and transition from an unextended configuration A (FIG. 3A) to a partially extended configuration A' (FIG. 3B) or to an extended configuration A" (FIG. 3C). As shown in FIGS. 3A-3C, in response to the lifting force F, the first acoustic panel articulates relative to a second acoustic panel 318b. Also in response to the upward force, the second acoustic panel articulates relative to a third acoustic panel 318c.

At operation 1404, the wall section may be coupled to one or more structural supports. For example, and with reference to FIG. 6A, structural supports 614 may be embedded in a foundation, such as the ground, and one or more support attachment assemblies 656 may secure the wall section 638 to the structural supports 614. In various embodiments, coupling the wall section with the structural support(s) maintains the wall section in a vertical orientation and/or helps to maintain the wall section in the extended configuration.

At operation 1406, the wall section may be coupled to one or more adjacent wall sections. For example, and with reference to FIG. 6C, the wall section 638a may be attached to an adjacent wall section 638b using one or more section attachment assemblies 650. In some embodiments, as shown in FIG. 6C, the major surfaces 666a and 666b of the wall sections 638 are coplanar such that the wall sections cooperate to form a substantially planar portion of a mitigation wall. In some embodiments, the major surfaces 666a and 666b of the wall sections 638 are not coplanar, such that the wall sections cooperate to form a corner (e.g., there is an angular separation between the surfaces). In various embodiments, the coupled wall sections may form a portion of a mitigation wall, such as an acoustic wall. In some embodiments, multiple wall sections may be coupled together to form a continuous and/or closed mitigation wall, for example surrounding an industrial worksite.

In certain embodiments, the wall section may be positioned adjacent the structural supports in an unextended configuration. This may facilitate construction of a mitigation wall at an industrial worksite. For example, as described herein, the wall section may be delivered to a worksite in an unextended configuration using a standard truck trailer or other equipment that may use existing roads and infrastructure. Once at the worksite, the wall section (in the unextended configuration) may be offloaded from the trailer and positioned adjacent two offset structural supports that are driven or fixed into the foundation. A crane or other lifting mechanism may therefore extend (e.g., unfold) the wall section adjacent the structural supports. This may facilitate subsequent attachment of the wall section to the structural supports and to adjacent wall sections to form the mitigation wall described herein.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A support attachment mechanism for securing an object to a structural support, the support attachment mechanism comprising:

a bracket configured to be positioned against the structural support; and an attachment mechanism configured to cooperate with the bracket to secure the object to the structural support, the attachment mechanism comprising:

a cable comprising a first coupling feature at a first end of the cable and a second coupling feature at a second end of the cable, each of the first and second coupling features having a width greater than a diameter of the cable;

a connector defining:

a first opening having a first end and a second end, one of the first or second coupling features configured to pass through the first opening at the first end and be retained by the first opening at the second end; and a second opening having a first end and a second end, one of the first or second coupling features configured to pass through the second opening at the first end and be retained by the second opening at the second end; and a fastener configured to couple the connector to the bracket.

2. The support attachment mechanism of claim 1, wherein:

the bracket comprises an opening;

the fastener is configured to change a distance between the connector and the bracket; and rotation of the fastener changes the distance between the connector and the bracket.

3. The support attachment mechanism of claim 1, wherein:

the connector comprises:

a first side;

a second side adjacent that first side; and a third side opposite the second side and adjacent the first side;

the first opening extends from the second side to the first side; and the second opening extends from the third side to the first side.

4. The support attachment mechanism of claim 3, wherein:

the first end of the first opening is positioned on the second side;

the second end of the first opening is positioned on the first side;

the first end of the second opening is positioned on the third side; and the second end of the first opening is positioned on the first side.

5. The support attachment mechanism of claim 1, wherein:

the connector comprises a tube structure; and the first and second openings are formed in a sidewall of the tube structure.

6. The support attachment mechanism of claim 5, wherein the fastener extends through the sidewall of the tube structure.

7. The support attachment mechanism of claim 1, wherein:

the cable comprises multistranded metal wires;

the first coupling feature comprises a first ball structure attached over the first end of the multistranded metal wires; and the second coupling feature comprises a second ball structure attached over the second end of the multistranded metal wires.

8. The support attachment mechanism of claim 7, wherein:

the first opening is at least partially circular and has a diameter greater than a diameter of the first ball structure; and the second opening is at least partially circular and has a diameter greater than a diameter of the second ball structure.

9. A support attachment assembly for securing an object to a fixed support, the support attachment assembly comprising:

a bracket configured to be positioned against the fixed support;

a first attachment mechanism configured to couple with the bracket along a first side of the fixed support to secure the object to the object to the fixed support, the first attachment mechanism comprising:

a first cable comprising a first end having a first coupling feature and a second end having a second coupling feature, a first connector configured to releasably retain each of the first coupling feature and the second coupling feature of the first cable; and a first fastener configured to couple the first connector to the bracket; and a second attachment mechanism configured to couple with the bracket along a second side of the fixed support to secure the object to the fixed support, the second attachment mechanism comprising:

a second cable comprising a first end having a first coupling feature and a second end having a second coupling feature;

a second connector configured to releasably retain each of the first coupling feature and the second coupling feature of the second cable; and a second fastener configured to couple the second connector to the bracket.

10. The support attachment assembly of claim 9, wherein the first fastener configured to change a distance between the first connector and the bracket.

11. The support attachment assembly of claim 10, wherein the second fastener is configured to change a distance between the second connector and the bracket.

12. The support attachment assembly of claim 10 wherein:

the first fastener comprises a threaded rod; and rotation of the first fastener changes the distance between the first connector and the bracket.

13. The support attachment assembly of claim 9, wherein:

the bracket comprises a first opening;

the first fastener extends through the first opening;

the bracket comprises a second opening; and the second fastener extends through the second opening.

14. The support attachment assembly of claim 13, wherein:

the first fastener is configured to rotate within the first opening; and the second fastener is configured to rotate within the second opening.

15. The support attachment assembly of claim 9, wherein:

the first connector defines a first channel and a second channel;

the first coupling feature of the first connector is configured to be inserted through a first portion of the first channel and retained within a second portion of the first channel; and the second coupling feature of the first connector is configured to be inserted through a first portion of the second channel and retained within a second portion of the second channel.

16. A support attachment assembly for securing and object to a structural support, the support attachment assembly comprising:

a bracket configured to be positioned against the structural support; and an attachment mechanism configured to cooperate with the bracket to secure the object to the structural support, the attachment mechanism comprising:

a cable comprising:

a first coupling feature at a first end of the cable, the first coupling feature configured to couple to a first portion of the bracket; and a second coupling feature at a second end of the cable, the second coupling feature having a width greater than a diameter of the cable;

a connector defining an opening having a first end and a second end, the second coupling feature configured to pass through the opening at the first end and be retained by the opening at the second end; and a fastener configured to couple the connector to the bracket, the fastener configured to change a distance between the connector and the bracket.

17. The support attachment assembly of claim 16, wherein the first coupling feature is configured to removably couple to the bracket.

18. The support attachment assembly of claim 16, wherein:

the bracket defines a first opening and a second opening;

the first coupling feature is coupled the bracket at the first opening; and the fastener extends through the second opening of the bracket.

19. The support attachment assembly of claim 16, wherein the first coupling feature comprises:

a first circular portion having a first diameter that is smaller than the first end of the opening and larger than the second end of the opening; and a second circular portion having a second diameter that is smaller than the first end and the second end of the opening.

20. The support attachment assembly of claim 16, wherein rotation of the fastener changes the distance between the connector and the bracket.

* * * * *